(12) United States Patent
Mahoney et al.

(10) Patent No.: US 11,782,397 B2
(45) Date of Patent: Oct. 10, 2023

(54) OPERATOR AUTOMATION SYSTEM

(71) Applicant: Johnson Controls Technology Company, Auburn Hills, MI (US)

(72) Inventors: Daniel C. Mahoney, Milwaukee, WI (US); Suvidha Raina, Milwaukee, WI (US); Dana A. Guthrie, St. Francis, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 281 days.

(21) Appl. No.: 16/698,427

(22) Filed: Nov. 27, 2019

(65) Prior Publication Data
US 2021/0157284 A1    May 27, 2021

(51) Int. Cl.
| | |
|---|---|
| *G05B 13/02* | (2006.01) |
| *G05B 19/418* | (2006.01) |
| *G06F 9/54* | (2006.01) |
| *G06F 16/23* | (2019.01) |
| *G06F 16/24* | (2019.01) |

(52) U.S. Cl.
CPC ......... *G05B 13/028* (2013.01); *G05B 19/418* (2013.01); *G06F 9/54* (2013.01); *G06F 16/2365* (2019.01); *G06F 16/24* (2019.01)

(58) Field of Classification Search
USPC ...................................................... 700/275
See application file for complete search history.

(56) References Cited

U.S. PATENT DOCUMENTS

| | | | | |
|---|---|---|---|---|
| 6,131,118 A | * | 10/2000 | Stupek, Jr. .............. | G06F 9/542 709/224 |
| 9,447,985 B2 | | 9/2016 | Johnson | |
| 10,505,756 B2 | * | 12/2019 | Park .................... | H04L 12/2812 |
| 10,757,604 B1 | * | 8/2020 | Huang .............. | H04W 28/0284 |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Jason D Mitchell
(74) *Attorney, Agent, or Firm* — Foley & Lardner LLP

(57) ABSTRACT

A system to replicate user interaction with a building management system (BMS), the system including a processing circuit including a processor and memory, the memory having instructions stored thereon that, when executed by the processor, cause the processing circuit to receive first BMS data describing a BMS event having a first category, receive second BMS data describing a user response to the BMS event, generate a model, based on the first and second BMS data, describing response patterns associated with the user response, wherein the response patterns include actions to replicate the user response, and generate, in response to receiving third BMS data having the first category, one or more control signals based the actions in the model to control the BMS to replicate the user response.

17 Claims, 31 Drawing Sheets

(56) References Cited

U.S. PATENT DOCUMENTS

| | | | |
|---|---|---|---|
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 10,929,258 B1* | 2/2021 | Gauf | G06F 11/263 |
| 10,991,046 B1* | 4/2021 | Hocaoglu | G06Q 40/06 |
| 11,156,978 B2 | 10/2021 | Johnson et al. | |
| 11,260,872 B2* | 3/2022 | Chen | G06N 20/20 |
| 2002/0165627 A1* | 11/2002 | Brown | H04L 67/564 700/56 |
| 2012/0022698 A1* | 1/2012 | Mackay | G06Q 10/06 700/275 |
| 2012/0323368 A1* | 12/2012 | White, III | H04L 41/0213 700/275 |
| 2015/0323918 A1* | 11/2015 | Nair | G06F 16/904 700/275 |
| 2017/0293844 A1* | 10/2017 | Gombolay | G06N 7/005 |
| 2018/0284223 A1* | 10/2018 | Otsuki | G08B 21/043 |
| 2019/0013023 A1 | 1/2019 | Pourmohammad et al. | |
| 2019/0079503 A1* | 3/2019 | Unterguggenberger | G05B 19/41865 |
| 2019/0095821 A1* | 3/2019 | Pourmohammad | G08B 21/10 |
| 2019/0098035 A1* | 3/2019 | Periaswamy | G05B 19/0428 |
| 2019/0179820 A1* | 6/2019 | El Kaed | G06F 16/9038 |
| 2019/0179858 A1* | 6/2019 | Douze | G06F 16/9536 |
| 2019/0310591 A1* | 10/2019 | Hazard | G05B 13/04 |
| 2019/0310592 A1* | 10/2019 | Hazard | G06N 5/04 |
| 2020/0082261 A1* | 3/2020 | Silberman | G06N 3/006 |
| 2020/0089173 A1* | 3/2020 | Hazard | G06N 20/00 |
| 2020/0114924 A1* | 4/2020 | Chen | G06N 5/003 |
| 2020/0125586 A1* | 4/2020 | Rezaeian | G06F 16/285 |
| 2020/0133211 A1* | 4/2020 | Lee | H04N 21/4667 |
| 2020/0193325 A1* | 6/2020 | Natsumeda | G06N 20/00 |
| 2020/0348662 A1* | 11/2020 | Cella | G05B 23/024 |
| 2020/0409822 A1* | 12/2020 | Balasubramanian | G06F 11/302 |
| 2021/0072709 A1* | 3/2021 | Oliver | H04L 12/2814 |
| 2021/0090161 A1* | 3/2021 | Chen | G06Q 40/025 |
| 2021/0304541 A1* | 9/2021 | Biggin | G06F 16/55 |
| 2021/0357029 A1* | 11/2021 | Celia | G06F 3/015 |
| 2022/0030108 A1* | 1/2022 | Premkumar | H04M 3/4938 |
| 2022/0096003 A1* | 3/2022 | Mai | A61B 5/4818 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System-Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid

(56) References Cited

OTHER PUBLICATIONS

State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

* cited by examiner

Action Items — 810

| Clean Equipment Alarms<br>[Clean Alarm]<br>10/4/2019 \| 10/5/2019<br>Hallway AHU<br>[Run] [Delete] — 812, 814, 816, 818, 820 | Release Door Ajar Alert<br>[Release Alert]<br>9/29/2019 \| 9/30/2019<br>Building 3 – Door 3<br>[Run] [Delete] | Release Door Ajar Alert<br>[Release Alert]<br>9/29/2019 \| 9/30/2019<br>Building 3 – Door 4<br>[Run] [Delete] | Release Door Ajar Alert<br>[Release Alert]<br>9/29/2019 \| 9/30/2019<br>Building 3 – Door 5<br>[Run] [Delete] |
|---|---|---|---|
| Widen Alarm Limit<br>[Equipment Configuration]<br>8/5/2019 \|<br>Motion Sensor 3<br>[Run] [Delete] | Trend Hot Water Supply<br>[Trends]<br>8/4/2019 \| 8/20/2019<br>Valve 283<br>[Run] [Delete] | Trend Valve<br>[Trends]<br>8/4/2019 \| 8/20/2019<br>Valve 288<br>[Run] [Delete] | Trend Blower<br>[Trends]<br>8/8/2019 \| 8/19/2019<br>Blower 110<br>[Run] [Delete] |
| Schedule Equipment<br>[Scheduling]<br>8/4/2019 \|<br>Cooling Compressor 210<br>[Run] [Delete] | Schedule Equipment<br>[Scheduling]<br>8/4/2019 \|<br>Cooling Compressor 211<br>[Run] [Delete] | Schedule Equipment<br>[Scheduling]<br>8/4/2019 \|<br>Cooling Compressor 212<br>[Run] [Delete] | Schedule Equipment<br>[Scheduling]<br>8/4/2019 \|<br>Cooling Compressor 213<br>[Run] [Delete] |
| Schedule Equipment<br>[Scheduling]<br>8/4/2019 \|<br>Cooling Compressor 214<br>[Run] [Delete] | | | |

FIG. 8

Alarm Manager

Viewing 1000 alarm(s) — You currently have over 1000 total alarms

ACTIONS ▼  FILTER ▼

| STATUS | NEW | PRIORITY | TYPE | TRIGGER VALUE | EQUIPMENT | NAME | SPACE | # | OCCURRED |
|---|---|---|---|---|---|---|---|---|---|
| | | 70 | HIGH ALARM | 1996 PPM | | SORPTION-O_CO2 | | 10 | |
| | | 200 | NORMAL | INACTIVE | | ROC COMM_ | | | 07/19/2019 12:43:28 PM |
| | | 70 | LOW ALARM | 64.9 DEG F | | FCU 2 DA-T | | | 07/19/2019 2:59:30 PM |
| | | 70 | LOW ALARM | 3.6% | | CARTRIDGE | | | 07/19/2019 2:03:30 PM |
| | | 70 | UNRELIABLE | -0.6 CU FT/H | | 5757-B2F1-NU | | | 07/18/2019 4:52:00 PM |
| | | 106 | NORMAL | ONLINE | 5757-AHU-3-3 | 5757-B3PH-AHU-3-3 | B3 CORP/NORTH | 338 | 07/18/2019 5:00:20 PM |
| | | 70 | HIGH ALARM | 531.00 PER MIN | 660-B1F08-NAE-02 | UFAS-ZN-218C | ZN-Q | 321 | 07/18/2019 5:17:20 PM |
| | | 70 | HIGH ALARM | 801 PPM | | UFAS-ZN-315 | ZN-Q | 293 | 07/19/2019 12:15:00 AM |
| | | 70 | HIGH ALARM | 804 PPM | | UFAS-ZN-218C | ZN-Q | 271 | |
| | | 70 | HIGH ALARM | 802 PPM | | | | 265 | |
| | | 70 | HIGH ALARM | 73.00% | 660-B1F08-NAE-01 | | | 252 | |

930 — There are a lot of VAV Alarms. Would you like me to fix the nuisance alarms? [Yes] [No]  Learn More

932

To see the full list of alarms on your site, export the alarms list. You can also filter or sort the alarms to view other alarms.

Details | Served By

Type: High Alarm
Equipment:
Space:
High Alarm Limit: 1,000 ppm
Low Alarm Limit: ppm
Trigger Value: 1996 ppm
Occurred: 07/19/2019 2:38:52 PM
Category: General
Description: Sorption Out Air CO2
Message Text:
Annotation: __Annotations__

CURRENTLY
Normal
504 ppm

FIG. 9A

Your Metasystant Update:
Issued on July 11, 2016

Hey Adam,

Here's what happened since your last update:

32 operator overrides were released after being overrode for 3 days. <u>Details</u>

34 alarms limit bands were widened to reduce noise. <u>Details</u>

3 pieces of equipment have gone into troubleshooting mode. <u>Details</u>

10 unbound references were removed. <u>Details</u>

<u>Change Settings</u>

Dismiss

FIG. 13

Override Details -
13 Overrides Over 3 Days Old

| ITEM | VALUE | EQUIPMENT | SPACE(S) + | |
|---|---|---|---|---|
| ☐ ZN-SP ZONE TEMPERATURE SETPOINT | OPERATOR OVERRIDE 74.0 DEG F | VMA-49 | ZONE 49 | RELEASE |
| ☐ ZN-SP ZONE TEMPERATURE SETPOINT | OPERATOR OVERRIDE 72.0 DEG F | VMA-48 | ZONE 48 | RELEASE |
| ☐ ZN-SP ZONE TEMPERATURE SETPOINT | OPERATOR OVERRIDE 75.0 DEG F | VMA-41 | ZONE 41 | RELEASE |
| ☐ SAFLOW-SP SUPPLY AIR FLOW SETPOINT | OPERATOR OVERRIDE 20.0 CFM | VMA-41 | ZONE 41 | RELEASE |
| ☐ ZN-SP ZONE TEMPERATURE SETPOINT | OPERATOR OVERRIDE 71.0 DEG F | VMA-38 | ZONE 38 | RELEASE |
| ☐ SAFLOW-SP SUPPLY AIR FLOW SETPOINT | OPERATOR OVERRIDE 65.0 CFM | VMA-34 | ZONE 34 | RELEASE |
| ☐ ZN-SP ZONE TEMPERATURE SETPOINT | OPERATOR OVERRIDE 70.0 DEG F | VMA-30 | ZONE 30 | RELEASE |
| ☐ HTG O HEATING OUTPUT | OPERATOR OVERRIDE 0% | VAV-026 | ZONE 26 | RELEASE |
| ☐ ZN-SP ZONE TEMPERATURE SETPOINT | OPERATOR OVERRIDE 70.0 DEG F | VAV-022 | ZONE 22 SOUTH CONFERENCE ROOM | RELEASE |
| ☐ ZN-SP ZONE TEMPERATURE SETPOINT | OPERATOR OVERRIDE 72.0 DEG F | VMA-22 | ZONE 22 CONFERENCE ROOM 232 | RELEASE |
| ☐ ZN-SP ZONE TEMPERATURE SETPOINT | OPERATOR OVERRIDE 73.0 DEG F | VMA-19 | ZONE 19 OFFICE 252 | RELEASE |

CANCEL    RELEASE ALL

FIG. 16

| | Date | Item | Type | Description | Value | Space(s) / Equipment |
|---|---|---|---|---|---|---|
| ☐ | ★ 04/01/2019 03:10:24 PM | AV1 | Command Failed | Adjust | 44→200 | Elev Lobby VAV-7 |
| ☐ | 03/25/2019 11:33:58 PM | ZN-T | Unreliable | Cafeteria B | 1800.0 | Cafeteria B VAV02 |
| ☐ | 03/14/2019 05:44:22 PM | jciadx1 | Subsystem | User Login Successful | 100.9.8.100 | |
| ☐ | 03/10/2019 02:14:11 PM | ZN-T | Low Alarm | F10-AHU-12 | 75.3 | Office B003 VAV-24 |
| ☐ | 02/13/2019 05:36:57 AM | EFFDAT-SP | Command | Adjust | 55.0→52.5 | Floor 3 507-B5PH-AHU-5P2 |
| ☐ | 01/30/2019 02:33:44 PM | Server | Metasystant | 32 Operator Overrides Released | | |
| ☐ | 01/30/2019 05:07:32 AM | ZNT-SP | Command | Adjust | 70.0→72.0 | |
| ☐ | 01/27/2019 05:54:14 AM | EFFDAT-SP | Command | Adjust | 52.5→55.0 | Floor 3 507-B5PH-AHU-5P2 |
| ☐ | 01/14/2019 09:43:10 AM | jciadx1 | Subsystem | User Login Successful | ::1 | |

FIG. 17

System Activity

Actions ▼     🔍   ✎   👥   ⋯

| | Date | Item | Type | Description | Value |
|---|---|---|---|---|---|
| ☐ ✱ | 04/01/2019 03:10:24 PM | AV1 | Command Failed | Adjust | 44→200 |
| ☐ ↻ | 03/25/2019 11:33:58 PM | ZN-T | Unreliable | Cafeteria B | 1800.0 |
| ☐ | 03/14/2019 05:44:22 PM | jciadx1 | Subsystem | User Login Successful | 100.9.8.100 |
| ☐ | 03/10/2019 02:14:11 PM | ZN-T | Low Alarm | F10-AHU-12 | 75.3 |
| ☐ | 02/13/2019 05:36:57 AM | EFFDAT-SP | Command | Adjust | 55.0→52.5 |
| ☐ | 01/30/2019 02:33:44 PM | Server | Metasystant | 32 Operator Overrides Released | |
| ☐ | 01/30/2019 05:07:32 AM | ZNT-SP | Command | Adjust | 70.0→72.0 |
| ☐ | 01/27/2019 05:54:14 AM | EFFDAT-SP | Command | Adjust | 52.5→55.0 |
| ☐ | 01/14/2019 09:43:10 AM | jciadx1 | Subsystem | User Login Successful | ::1 |

Details
Metasystant 32 operator overrides were in affect for 3 days and have been released.
- ZN-SP on VAV-32
- ZN-SP on VAV-32
- ZN-SP on VAV-32
- ZN-SP on VAV-32
- ZN-SP on VAV-32
- ZN-SP on VAV-32

[ Undo Release All ]

Filters ▼

FIG. 17A

OPERATOR AUTOMATION SYSTEM

BACKGROUND

The present application relates generally to a building management system ("BMS") and more particularly to analyzing and automating user actions within the BMS.

A building management system ("BMS") is, in general, a system of devices configured to control, monitor, and manage equipment in or around a building or building area. A BMS may include a heating, ventilation, and air conditioning ("HVAC") system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, music, lighting, etc.) configured to facilitate monitoring and controlling the building space.

Security, operation, and maintenance centers often handle high volumes of event and alarm data generated by elements connected to a BMS. Some elements may include computers, virtual memory systems, operating systems, applications (e.g., applications in a composite application management platform), wireless sensors, controllers, and other site-monitoring devices and systems. Acknowledging and acting on the numerous events and alarms may be very challenging.

SUMMARY

One implementation of the present disclosure relates to a system to replicate user interaction with a building management system (BMS). The system includes a processing circuit including a processor and memory. The memory has instructions stored thereon that, when executed by the processor, cause the processing circuit to receive first BMS data describing a BMS event having a first category, receive second BMS data describing a user response to the BMS event, generate a model, based on the first and second BMS data, describing response patterns associated with the user response, wherein the response patterns include actions to replicate the user response, and generate, in response to receiving third BMS data having the first category, one or more control signals based the actions in the model to control the BMS to replicate the user response.

In some embodiments, the memory further includes instructions stored thereon that, when executed by the processor, cause the processing circuit to receive, from a user one or more search terms, query the BMS with the one or more search terms to determine associated BMS equipment having a problem, generate one or more action items to solve the problem, and update the model to include the one or more action items. In some embodiments, the problem is at least one of a fault, an override, or a misconfigured setting. In some embodiments, the memory further including instructions stored thereon that, when executed by the processor, cause the processing circuit to execute the updated model by generating one or more control signals based on the one or more action items to change a parameter associated with the BMS equipment having the problem.

In some embodiments, the system configures a user interface of the BMS based on the model. In some embodiments, the system configures the user interface of the BMS based on the model and an estimated interest associated with information displayed by the user interface. In some embodiments, the actions to replicate the user response include at least one of a trend correction action, an equipment scheduling action, or an alarm override action. In some embodiments, the system interacts with the BMS through an application programming interface (API).

Another implementation of the present disclosure relates to a method of replicating user interactions with a building management system (BMS). The method including receiving, from the BMS, first BMS data describing a BMS event having a first category, receiving, from the BMS, second BMS data describing a user response to the BMS event, generating a model, based on the first and second BMS data, the model describing response patterns associated with the user response, wherein the response patterns include one or more actions to replicate the user response, and in response to receiving from the BMS, third BMS data having the first category, sending data to the BMS based on the model, wherein the data includes an action of the one or more actions to replicate the user response.

In some embodiments, the method further includes receiving, from a user, one or more search terms, querying the BMS with the one or more search terms to identify associated BMS equipment having a problem, generating one or more additional actions to address the problem, and updating the model to include the one or more additional actions. In some embodiments, the problem is at least one of a fault, an override, or a misconfigured setting.

In some embodiments, the method further includes executing the updated model by sending additional data to the BMS, wherein the additional data includes the one or more additional actions to change a parameter associated with the BMS equipment having the problem. In some embodiments, the method further includes configuring a user interface of the BMS based on the model. In some embodiments, the method further includes generating an interest score, the interest score representing a user's estimated interest in information displayed by the user interface, and updating the user interface based on the interest score. In some embodiments, the one or more actions to replicate the user response include at least one of a trend correction, an equipment scheduling action, or an alarm override action.

Another implementation of the present disclosure relates to an automated facility manager for a building management system (BMS). The automated facility manager including an action database, the action database storing one or more actions, a behavior analysis circuit, and a behavior replication circuit. The behavior analysis circuit configured to receive user input to the BMS, the user input describing a user response to a BMS event, classify the user input based on a category, the category describing a type of interaction with the BMS, and generate actions to replicate the user response based on the category. The behavior replication circuit configured to execute the one or more actions to generate one or more control signals to send to the BMS, wherein the one or more control signals cause the BMS to replicate the user response.

In some embodiments, the automated facility manager further includes an audit circuit configured to receive, from a user, one or more search terms, query the BMS with the one or more search terms to determine associated BMS equipment having a problem, and generate actions to solve the problem. In some embodiments, the problem is at least one of a fault, an override, or a misconfigured setting. In some embodiments, the audit circuit is further configured to execute the actions by generating one or more control signals to change a parameter associated with the BMS equipment having the problem.

In some embodiments, the behavior analysis circuit is further configured to modify a user interface of the BMS based on the received user input. In some embodiments, the behavior analysis circuit if further configured to modify the user interface based on an estimated interest associated with information displayed by the user interface. In some embodiments, the one or more actions include at least one of a trend correction action, an equipment scheduling action, or an alarm override action. In some embodiments, the automated facility manager interacts with the BMS through an application programming interface (API).

BRIEF DESCRIPTION OF THE DRAWINGS

FIG. 8 is another interface of the operator automation controller of FIG. 6 including one or more actions, according to some embodiments.

FIG. 9A is the interface of FIG. 9 including a suggestion, according to some embodiments.

FIG. 13 is another interface of the operator automation controller of FIG. 6 including a summary, according to some embodiments.

FIG. 16 is an overrides interface of the operator automation controller of FIG. 6, according to some embodiments.

FIG. 17 is a system activity interface of the operator automation controller of FIG. 6, according to some embodiments.

FIG. 17A is the system activity interface of FIG. 17 including activity details, according to some embodiments.

DETAILED DESCRIPTION

Figure 1:
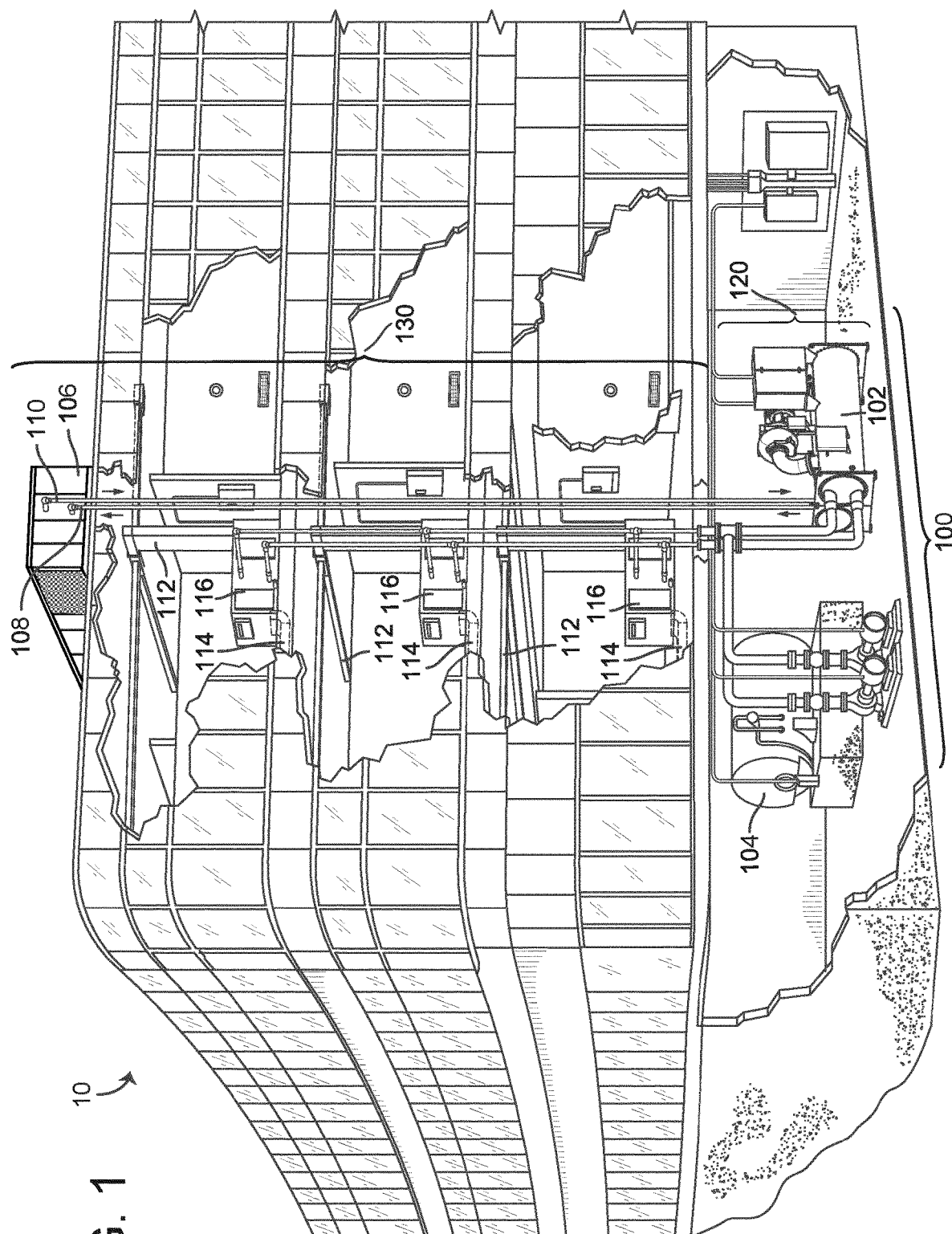
FIG. 1 is a drawing of a building equipped with a HVAC system, according to some embodiments.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Overview

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Referring generally to the FIGURES, systems and methods of an operator automation system are shown, according to various exemplary embodiments. The operator automation system may be configured to automate a BMS system by tracking and replicating user actions. Commonly performed user actions may be automated to reduce user workload. For example, the operator automation system may learn to respond automatically to BMS events as the user would. Additionally, the operator automation system may be configured to diagnose and treat potential BMS problems.

In some embodiments, the operator automation system learns behaviors and input patterns by monitoring user actions. For example, the operator automation system may train a machine-learning algorithm with the user actions to develop a model of the user behaviors. The operator automation system may then replicate the behaviors and input patterns to respond to similar situations. In some embodiments, the operator automation system learns how a user typically responds to an alarm and automates the response to future alarms, replicating what the user would do in that scenario. In some embodiments, the operator automation system reconfigures various BMS programs based on estimated user interest in the information the program is providing. In some embodiments, the operator automation system runs queries for various problems in the BMS and automatically corrects the problems. In various embodiments, the operator automation system prompts the user before automation. For example, the operator automation system may prompt the user to accept future automation of an action.

Building HVAC Systems and Building Management Systems

Figure 2:
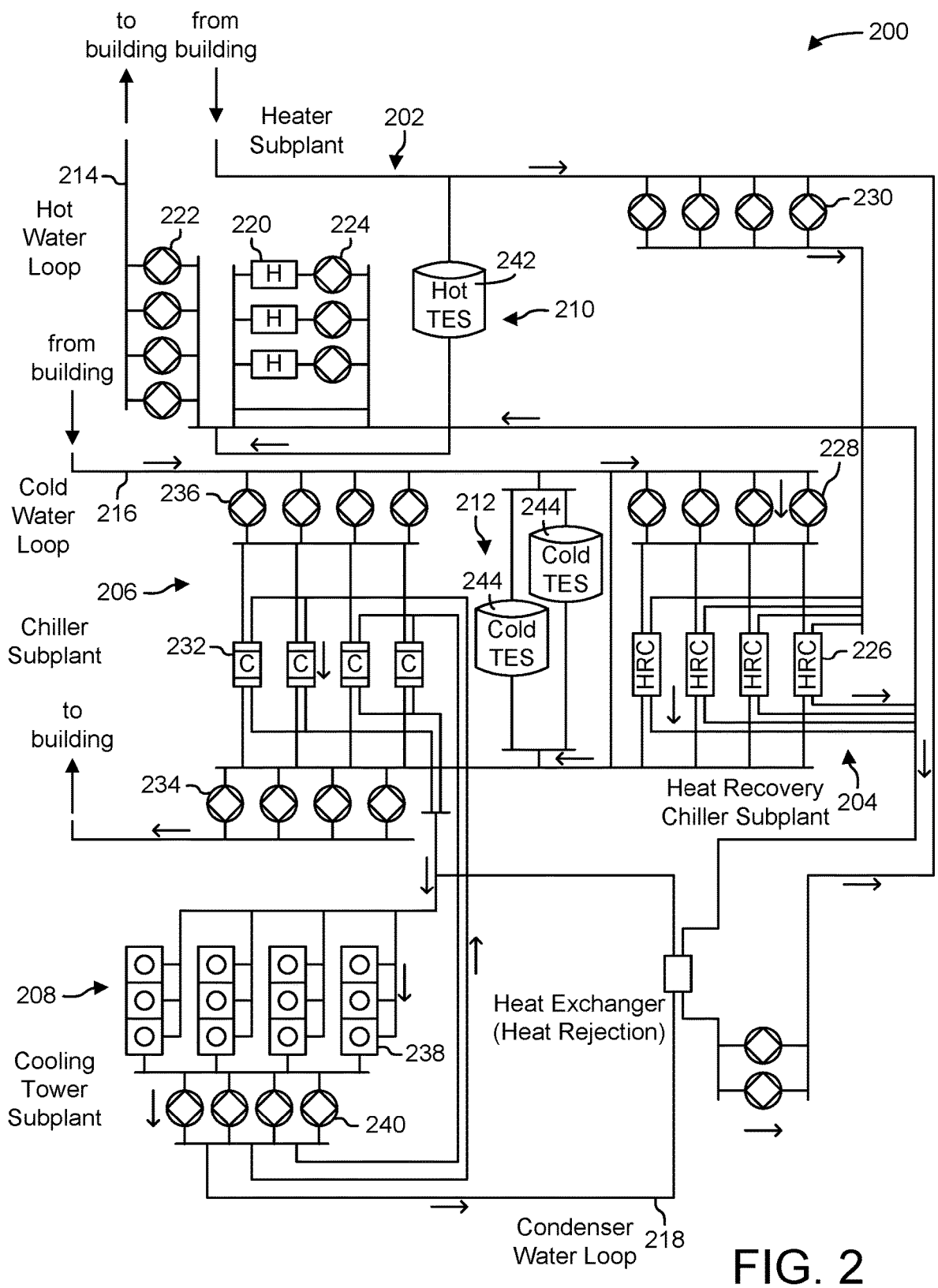
FIG. 2 is a block diagram of a waterside system that can be used to serve the heating or cooling loads of the building of FIG. 1, according to some embodiments.
Figure 3:
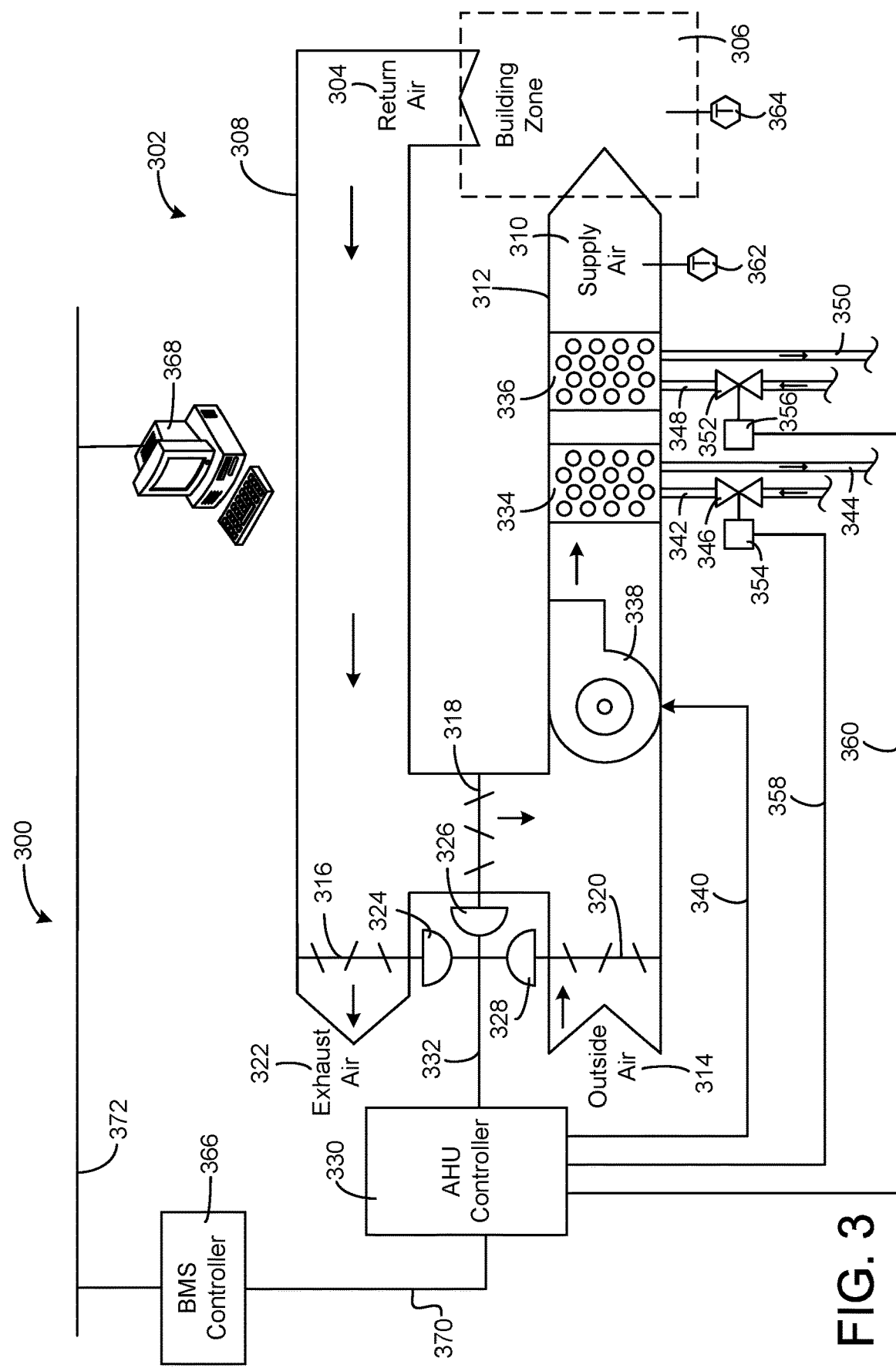
FIG. 3 is a block diagram of an airside system that can be used to serve the heating or cooling loads of the building of FIG. 1, according to some embodiments.
Figure 4:
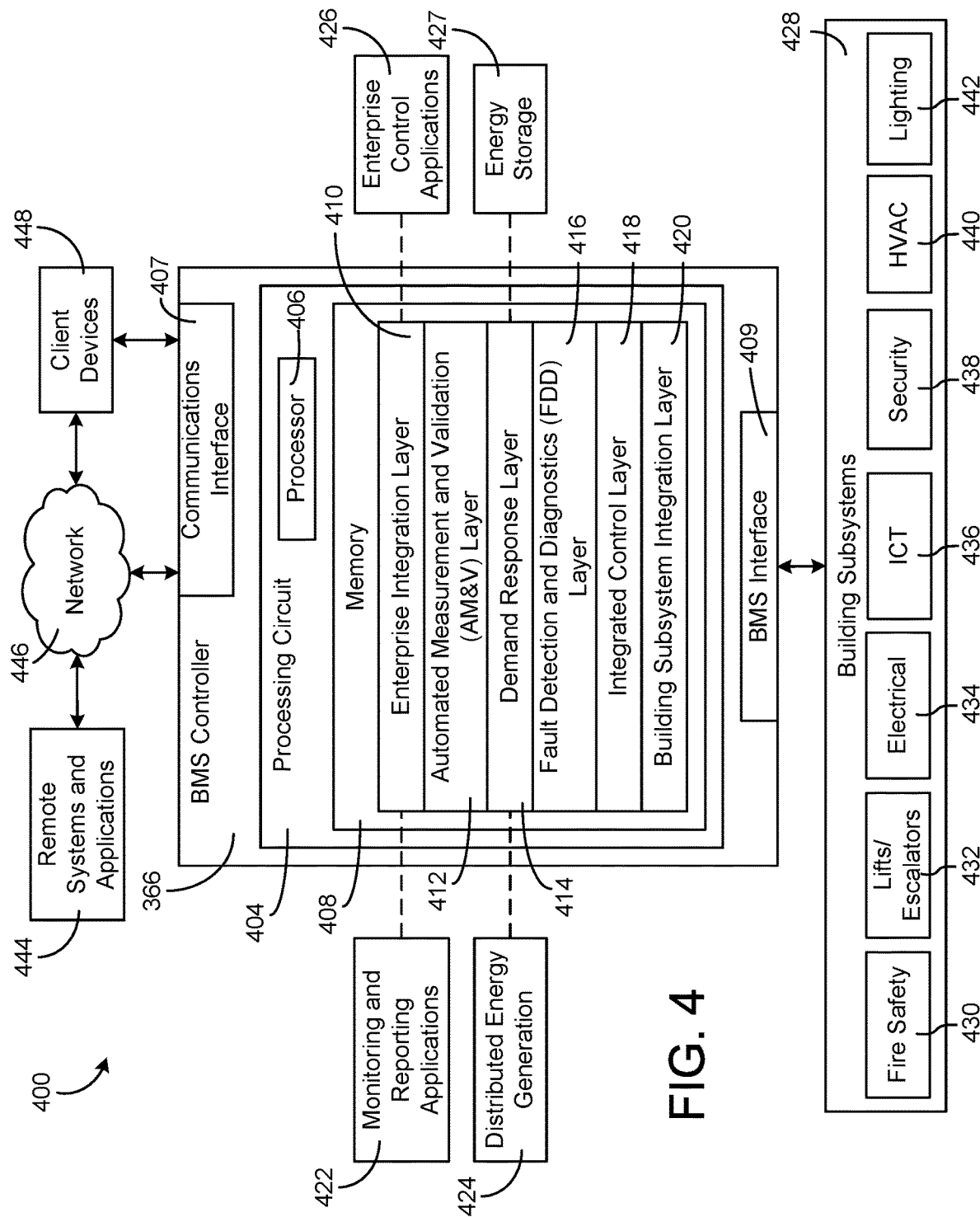
FIG. 4 is a block diagram of a building management system (BMS) which can be used to monitor and control the building of FIG. 1, according to some embodiments.
Figure 5:
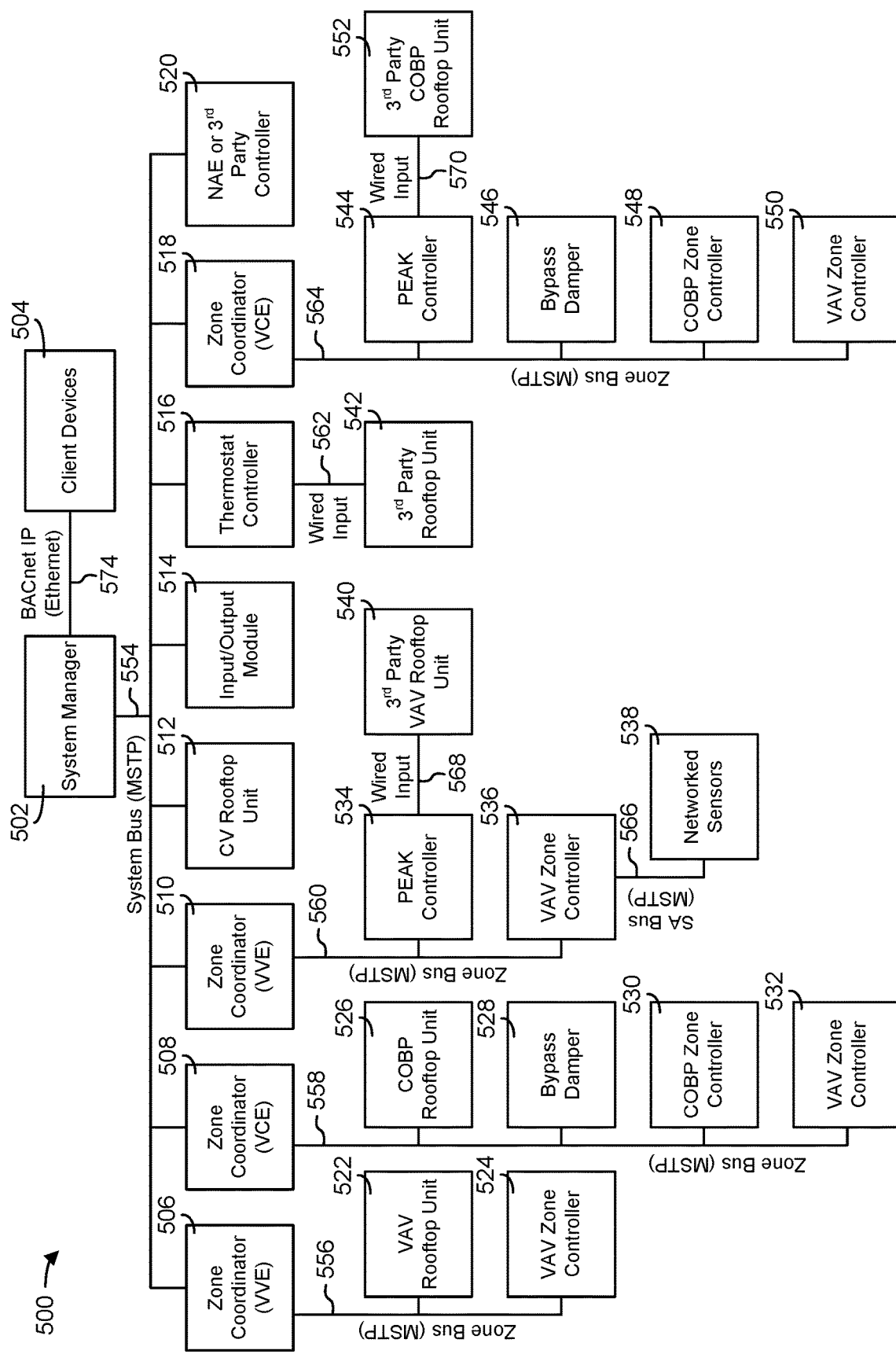
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Operator Automation Controller

Figure 6:
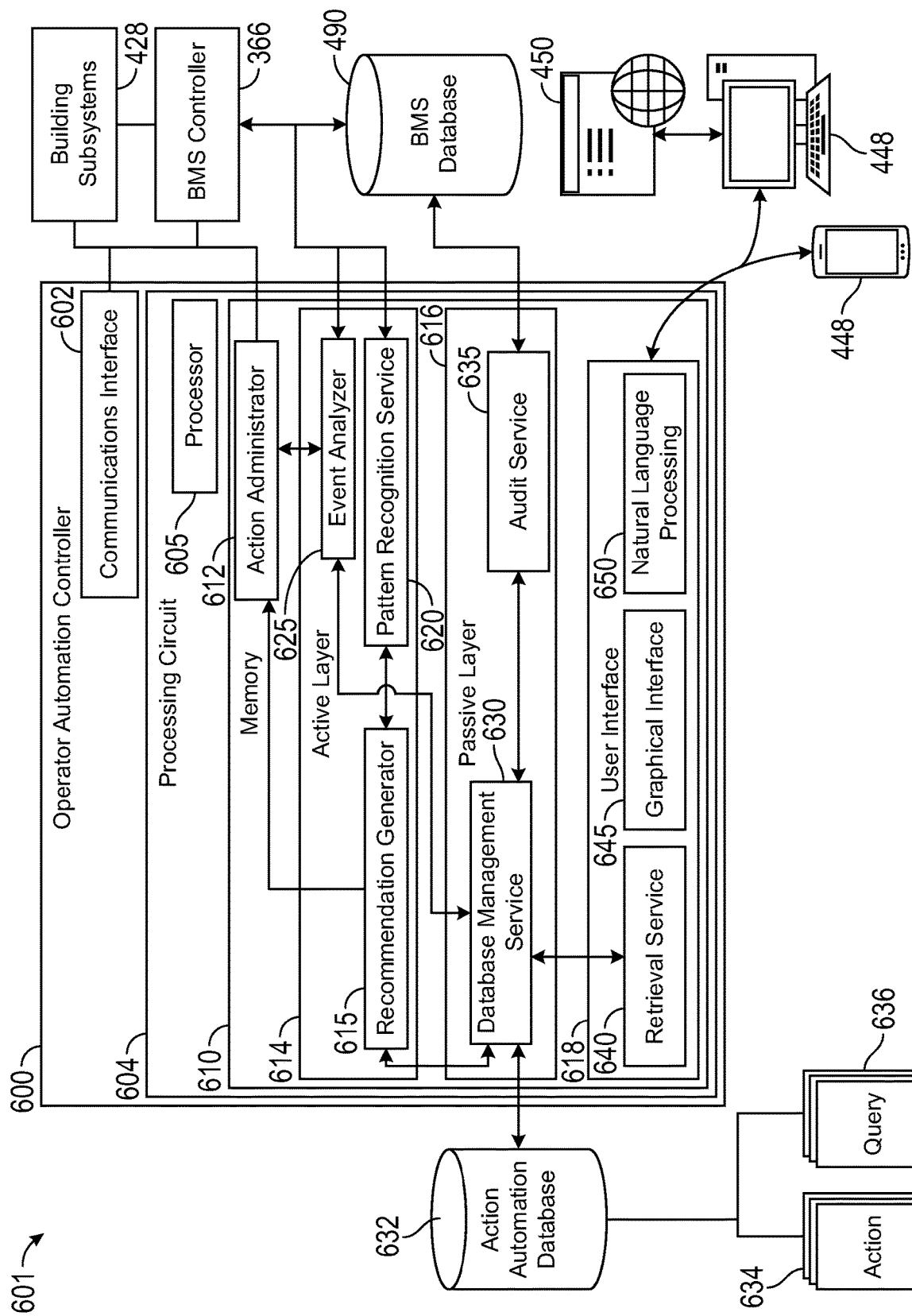
FIG. 6 is a block diagram of an operator automation controller that can be used to monitor and control the BMS of FIGS. 4-5.

Referring now to FIG. 6, an operator automation system 601 is shown, according to an exemplary embodiment. Operator automation system 601 may be configured to automate one or more actions associated with a BMS (e.g., BMS 400, BMS 500, etc.). In various embodiments, operator automation system 601 learns to respond automatically to BMS events. For example, operator automation system 601 may analyze user actions to develop a model of user behavior that can be used to respond to different BMS events (e.g., by replicating user actions). Additionally or alternatively, operator automation system 601 may execute queries to find and fix BMS problems. Operator automation system 601 may at least partially integrate with BMS 500 (e.g., via BMS controller 366 and/or building subsystems 428, etc.). For example, operator automation system 601 may be a background process of BMS 500.

Operator automation system 601 may generate action items (e.g., automated action recommendations) based on user input and/or BMS data. In various embodiments, operator automation system 601 facilitates active automation and passive automation. Active automation may include analyzing and replicating user actions. For example, operator automation system 601 may learn to respond to BMS events as the user would. In some embodiments, operator automation system 601 may prompt the user to authorize active automation. For example, operator automation system 601 may determine a user silences nuisance VAV alarms every week and may prompt the user: "I see you silence these VAV alarms every week. Would you like me to silence them automatically from now on?"

Passive automation may include running queries to detect problems in BMS 500 and automatically correcting the problems. For example, operator automation system 601 may search for unscheduled equipment and suggest scheduling it. In some embodiments, operator automation system 601 may prompt the user to authorize passive automation. For example, operator automation system 601 may determine an HVAC chiller is untrended and may prompt the user: "Chiller #20 is untrended. Would you like to apply the same trends to Chiller #20 as applied to similar chillers?" Problems in BMS 500 may include out of service equipment, indefinite overrides, misconfigured equipment trends, out-of-date or unacknowledged alarms, system vulnerabilities (e.g., stale user passwords, etc.), unscheduled equipment, and/or other conditions related to a BMS.

Operator automation system 601 is shown to include operator automation controller 600 and action automation database 632. In some embodiments, operator automation controller 600 is coupled to BMS controller 366, building subsystems 428, and/or BMS database 490. Operator automation controller 600 may send commands to BMS via BMS controller 366. For example, operator automation controller 600 may turn off one of pumps 228 by sending a control signal to BMS controller 366. In some embodiments, BMS database 490 stores information relating to the operation of BMS 500. For example, BMS database 490 may store alarm data, event data, security data, equipment trend data, system configuration settings, equipment configuration settings, and/or other BMS related data. In various embodiments, BMS database 490 includes information describing user actions and/or other operation interactions with BMS 500.

Action automation database 632 may store one or more actions 634 and one or more queries 636. Actions 634 may be a data structure representation including one or more commands. Actions 634 may be processed (e.g., executed, converted into BMS control signals, etc.) and sent to BMS controller 366 and/or building subsystems 428. For example, an action 634 may include a command to trend untrended building equipment. To continue the example, execution of the action 634 may include generating one or more BMS control signals to cause BMS database 490 to store trend data for the specified building equipment.

Queries 636 may be a data structure representation including one or more search parameters to analyze BMS database 490. In various embodiments, queries 636 are configured to identify problems in BMS database 490 and generate one or more actions 634 to correct the problems. Actions 634 and queries 636 are discussed in more detail below.

In some embodiments, operator automation controller 600 interfaces with client devices 448. Client devices 448 may display information to users and/or receive input from users. For example, operator automation controller 600 may receive a confirmation from a user via client devices 448 before executing an automated task. In various embodiments, client devices 448 display interface 450. In some embodiments, users provide input to operator automation controller 600 via interface 450 displayed on client devices 448. In some embodiments, interface 450 is a web-based interface. For example, interface 450 may be a web application. Additionally or alternatively, interface 450 may be a mobile interface. For example, interface 450 may be a mobile phone application.

Operator automation controller 600 is shown to include communications interface 602 and processing circuit 604. Communications interface 602 may facilitate communications between operator automation controller 600 and external systems (e.g., BMS controller 366, building subsystems 428, BMS database 490, etc.). Communications between communications interface 602 and external systems may facilitate user control, monitoring, and adjustment of BMS controller 366, building subsystems 428, BMS database 490, and/or BMS 500. Additionally or alternatively, communications interface 602 may facilitate communications between operator automation controller 600 and client devices 448. In some embodiments, communications interface 602 is or interactions with communications interface 407 of BMS controller 366.

Communications interface 602 may be or include wired or wireless communications interfaces (e.g., jacks, antennas, transmitters, receivers, transceivers, wire terminals, etc.) for conducting data communications with BMS controller 366 or other external systems or devices. In various embodiments, communication via communications interface 602 is direct (e.g., local wired or wireless communications) or via communications network 446 (e.g., a WAN, the Internet, a cellular network, etc.). For example, communications interface 602 may include an Ethernet card and port for sending and receiving data via an Ethernet-based communications link or network. In another example, communications interface 602 may include a Wi-Fi transceiver for communicating via a wireless communications network. In another example, communications interface 602 may include cellular or mobile phone communications transceivers.

Processing circuit 604 may be communicably connected to communications interface 602 such that processing circuit 604 and the various components thereof may send and receive data via communications interface 602. Processing circuit 604 includes processor 605 and memory 610. Processor 605 and memory 610 may be any type of processor and memory as described above with reference to processor 406 and memory 408.

Still referring to FIG. 6, memory 610 is shown to include action administrator 612, active layer 614, passive layer 616, and user interface 618. User interface 618 may manage user interaction with operator automation controller 600 via interface 450. For example, user interface 618 may send automation requests (e.g., requesting user authorization to execute actions 634) and/or receive automation commands (e.g., user authorization to execute actions 634) via user interface 618. User interface 618 may be configured to display one or more graphical user interfaces to a user via interface 450. User interfaces are described in detail below with reference to FIGS. 7-18.

In some embodiments, user interface 618 is configured to facilitate natural language interaction with a user. For example, user interface 618 may receive verbal or written requests from a user and parse the requests to determine one or more intended actions (e.g., user commands) for operator automation controller 600.

User interface 618 is shown to include retrieval service 640, graphical interface 645, and natural language processing ("NLP") 650. Retrieval service 640 may retrieve actions 634 and/or queries 636 for display to a user. Additionally or alternatively, retrieval service 640 may format actions 634 for display. For example, retrieval service 640 may retrieve an action 634 from action automation database 632 and format the action 634 for user authorization. In some embodiments, retrieval service 640 retrieves actions 634 and/or queries 636 from action automation database 632 using one or more rules. For example, retrieval service 640 may retrieve actions 634 on a scheduled basis. As a further example, retrieval service 640 may retrieve only the 20 most recent actions 634. In some embodiments, retrieval service 640 formats the display of actions 634 and/or queries 636 according to one or more rules. For example, retrieval service 640 may configure interface 450 to display actions 634 having a high priority more prominently than those with a low priority.

Retrieval service 640 may be an application programming interface ("API"). In some embodiments, retrieval service 640 publishes a GET command to retrieve actions 634. For example, the GET command may be represented by the following data model:

```
© Johnson Controls
GET /api/metasystant/actionItems/{id}
    payload:
    { }
    responses:
    SUCCESS: 200 Response "OK"
    payload:
    {
        "self": "https://{hostname}/api/metasystant/actionItems/00000000-0000-
0000-0000-000000000000",
            "id": "00000000-0000-0000-0000-000000000000",
            "name": "AV1",
            "category": "",
            "creationDateTime": "2000-01-01T00:00:00",
            "objects": [
                {
                    "id": "00000000-0000-0000-0000-000000000000",
                    "itemReference": "M1234567:NAE/Inputs.AV1",
                    "name": "AV1"
                }
            ],
            "viewDateTime": "2000-01-01T00:00:00"
    }
    Content-Type: application/json
    FAILURE (authentication): 401 Response "Unauthorized"
    FAILURE (authorization): 403 Response "Forbidden"
```

| FAILURE (no such action item): 404 Response "Not Found"
| FAILURE (unsupported HTTP verb): 405 Response "Method Not Allowed"

Graphical interface 645 may present one or more graphical user interfaces to a user. For example, graphical interface 645 may generate one or more dashboards that may be viewed and navigated by a user. In some embodiments, graphical interface 645 displays several graphical user interface ("GUI") elements (e.g., widgets, dashboard controls, windows, etc.) for displaying automation requests, key performance indicators ("KPI"), and/or other information to users. In some embodiments, the GUI elements associated with operator automation controller 600 are integrated with the GUI elements associated with BMS 500. For example, the GUI elements associated with operator automation controller 600 may be a navigable subset of the GUI elements associated with BMS 500.

NLP 650 may facilitate conversational interaction (e.g., how a human would respond if provided with the same question or statement) between operator automation controller 600 and a user. NLP 650 may convert user input (e.g., vocal input, text input, etc.) into one or more control inputs for operator automation controller 600. For example, NLP 650 may determine, based on a conversational context and conversational parameters, one or more actions desired by a user and/or generate one or more control signals to control operator automation controller 600 based on the one or more desired actions.

Action administrator 612 may facilitate control of BMS 500. In some embodiments, action administrator 612 is integrated with BMS controller 366 and/or building subsystems 428. Action administrator 612 may receive actions 634 and convert the actions 634 into control signals to operate BMS 500. As one non-limiting example, action administrator 612 may receive an action 634 to reset stale user passwords and in response may generate one or more control signals for BMS controller 366 to cause one or more user devices associated with BMS 500 to reset the associated stale passwords and prompt users to create new passwords. In various embodiments, action administrator 612 receives commands (e.g., actions 634) from active layer 614 and passive layer 616. Action administrator 612 may prompt a user (e.g., via user interface 618) for authorization before executing an action 634. Action administrator 612 may be an API. In some embodiments, action administrator 612 publishes a PUT command to execute an action 634. For example, the PUT command may be represented by the following data model:

© Johnson Controls
PUT /alarms/{id}/execute
    payload:
    { }
    Content-Type: application/json
    responses:
    SUCCESS: 204 Response "No Content"
    FAILURE (authentication): 401 Response "Unauthorized"
    FAILURE (authorization): 403 Response "Forbidden"
    FAILURE (no such action item): 404 Response "Not Found"
    FAILURE (unsupported HTTP verb): 405 Response "Method Not Allowed"

Active layer 614 may facilitate active automation to analyze and replicate user actions. Active layer 614 may learn to respond to BMS events as a user would. Active layer 614 may train a machine-learning algorithm generate a model of user behavior. The model may represent repeated user actions and/or patterns of repeated use. Additionally or alternatively, operator automation controller 600 may use the model to operate BMS 500 as the user would. Active layer 614 may include recommendation generator 615, pattern recognition service 620, and event analyzer 625.

Pattern recognition service 620 may receive data (e.g., BMS data, user input to BMS 500, etc.) and analyze the data to determine patterns. The patterns may be used to replicate a user's response to a BMS event. For example, the patterns may represent how the user responds to a door open alarm. In some embodiments, patterns are used to generate a model of a user's interaction with BMS 500. The model may represent one or more users. In some embodiments, the model facilitates operation of BMS 500 as the user would. For example, pattern recognition service 620 may determine a user regularly widens various alarm limits associated with HVAC equipment and update a model such that operator automation controller 600 may respond similarly (e.g., by widening alarm limits) for comparable HVAC equipment. In some embodiments, pattern recognition service 620 includes a machine learning and/or artificial intelligence circuit to facilitate pattern recognition and/or model generation.

In some embodiments, pattern recognition service 620 may classify data (e.g., BMS data, user input to BMS 500, etc.) to facilitate pattern recognition. The data may be classified according to one or more rules. The one or more rules may describe a sequence of events. For example, the rules may identify specific events that must occur in a specific order. Additionally or alternatively, the rules may describe a timing of events. For example, the rules may identify a minimum timing between events. In some embodiments, pattern recognition service 620 identifies patterns based on common events that generally occur together. For example, in response to a false fire alarm, a user may tag a smoke detector as having a weak battery or may indicate that the smoke detector is detecting dust as smoke. In response, pattern recognition service 620 may determine smoke alarms having similar characteristics (e.g., an isolated smoke alarm event for a smoke detector that is out of service or in an area with elevated particulate matter in the air) is a false alarm. Furthermore, in response to the false alarm, the user may submit a work order request for the smoke detector. Similarly, pattern recognition service 620 may indicate a work order request for comparable smoke detectors having comparable false alarms.

Pattern recognition service 620 may couple to recommendation generator 615 and may send recommendation generator 615 data indicating patterns (e.g., user response patterns, BMS event patterns, etc.). Pattern recognition service 620 may store patterns. In some embodiments, pattern recognition service 620 searches through stored patterns to determine if a pattern associated with received BMS data exists. For example, pattern recognition service 620 may receive BMS data, analyze the BMS data, and determine if a saved pattern applies to the BMS data. In some embodiments, pattern recognition service 620 updates saved patterns over time. Pattern recognition service 620 may send saved patterns to recommendation generator 615. For example, pattern recognition service 620 may receive BMS data, analyze the BMS data, determine a saved pattern applies to the BMS data, and send the determined pattern to recommendation generator 615.

Recommendation generator 615 may generate an action 634 based on received data (e.g., BMS data, patterns, etc.). For example, recommendation generator 615 may receive first BMS data indicating a fire alarm and second pattern data indicating the fire alarm was likely triggered by an out of service smoke detector and may generate an action 634 to silence the fire alarm and submit a work order request for the smoke detector. In some embodiments, recommendation generator 615 may use an existing action 634. Additionally or alternatively, recommendation generator 615 may modify an existing action 634. Recommendation generator 615 may save the action 634 in action automation database 632. Actions 634 may include associated BMS data and pattern data received from pattern recognition service 620. Additionally or alternatively, recommendation generator 615 may send the action 634 to action administrator 612 for execution. For example, recommendation generator 615 may receive data indicating a smoke alarm is a false alarm, generate an action 634 to silence the smoke alarm, and send the action 634 to action administrator 612 to override the smoke alarm.

Event analyzer 625 may receive data (e.g., BMS data, user interactions with BMS 500, etc.) and search action automation database 632 to determine if there is an existing action 634 associated with the received data. For example, event analyzer 625 may receive BMS data indicating a fire alarm and elevated particulate levels in the air, and may search action automation database 632 for actions 634 associated with that context. In some embodiments, event analyzer 625 includes machine learning and/or artificial intelligence circuits to facilitate matching of actions 634 based on received data. Event analyzer 625 may classify received data to facilitate matching of actions 634. For example, event analyzer 625 may receive data indicating a fire alarm event and may classify the data as type "alarm" and "fire" to facilitate efficient searching of action automation database 632. In some embodiments, event analyzer 625 sends retrieved actions 634 to action administrator 612 for execution by BMS 500.

Still referring to FIG. 6, passive layer 616 may facilitate passive automation by querying BMS 500 for problems and correcting the problems. For example, passive layer 616 may search for unscheduled equipment and suggest scheduling it. In various embodiments, passive layer 616 may execute queries 636 to develop actions 634. Passive layer 616 includes database management service 630 and audit service 635.

Database management service 630 may manage interactions with action automation database 632. In various embodiments, database management service 630 facilitates creation of new actions 634 and/or queries 636. Additionally or alternatively, database management service 630 may facilitate editing of existing actions 634 and/or queries 636. For example, user interface 618 may present an action 634 to a user. In response to the user rejecting the action 634, database management service 630 may update the action 634 to include an "action dismissed date" indicating that the user declined the action on that date. In some embodiments, database management service 630 publishes a PUT command to update the action dismissed date. For example, the PUT command may be represented by the following data model:

```
© Johnson Controls
PUT /alarms/{id}/dismiss
   payload:
   { }
   Content-Type: application/json
   responses:
   SUCCESS: 204 Response "No Content"
   FAILURE (authentication): 401 Response "Unauthorized"
   FAILURE (authorization): 403 Response "Forbidden"
   FAILURE (no such action item): 404 Response "Not Found"
   FAILURE (unsupported HTTP verb): 405 Response "Method Not Allowed"
```

In various embodiments, database management service 630 manages internal interaction with action automation database 632. For example, database management service 630 may receive a search request from event analyzer 625 for actions 634 relating to a fire alarm event triggered by an out of service smoke detector. As a further non-limiting example, database management service 630 may receive a request from retrieval service 640 to retrieve actions 634 for display to a user. In some embodiments, database management service 630 may facilitate interaction via an API.

Database management service 630 may retrieve queries 636 to send to audit service 635. Audit service 635 may search BMS database 490 using queries 636 to generate actions 634. In some embodiments, queries 636 are generated based on user input. For example, in response to a user request to reset all stale passwords, database management service 630 may generate a query 636 to search BMS database 490 for all stale user passwords. To continue the example, audit service 635 may run the query 636 on BMS database 490 and generate an action 634 to reset the identified stale user passwords. The generated action 634 may be sent to action administrator 612 for execution and the identified stale user passwords reset. In some embodiments, actions 634 require user authentication (e.g., a user must approve of an action 634 before it may be executed). In some embodiments, actions 634 are executed without user authentication.

Actions 634 may be a data structure including a name, an action category, a creation time and date, and one or more objects that the action will involve. For example, actions 634 may be represented by the following data model:

| Name | Data Type | Allow Nulls |
| --- | --- | --- |
| Id | int | No |
| Name | nvarchar(255) | No |
| Category | int | No |
| Creation Date Time | datetime | No |
| Object | varchar(38) | Yes |
| View Date Time | datetime | Yes |
| Action Date Time | datetime | Yes |
| Action Type | int | Yes |

In some embodiments, actions 634 further include a time and date associated with when a user viewed the action 634, an action date, and an action type. In some embodiments, one or more fields of actions 634 are blank at creation. For example, a time and date field associated with when a user views an action 634 may be blank until a user views the specific action 634. Queries 636 may be a data structure including a name, a query term, a category, and a creation date and time. For example, queries 636 may be represented by the following data model:

| Name | Data Type | Allow Nulls |
| --- | --- | --- |
| Id | int | No |
| Name | nvarchar(255) | No |
| Query | nvarchar(max) | No |
| Category | int | No |
| Creation Date Time | datetime | No |

In some embodiments, queries 636 are hard coded (e.g., default, shipped with the product, etc.). Additionally or alternatively, queries 636 may be generated dynamically based on input from a user (e.g., via NLP 650).

Operator Automation Controller Interface

Referring now generally to FIGS. 7-18, various exemplary embodiments of interface 450 for operator automation controller 600 are shown. In various embodiments, operator automation controller 600 displays actions 634 to a user via interface 450. In some embodiments, a user provides authentication (e.g., accepts execution of actions 634) via interface 450. For example, interface 450 may display an action 634 and a user may select a "run" option to execute the action 634.

Figure 7:
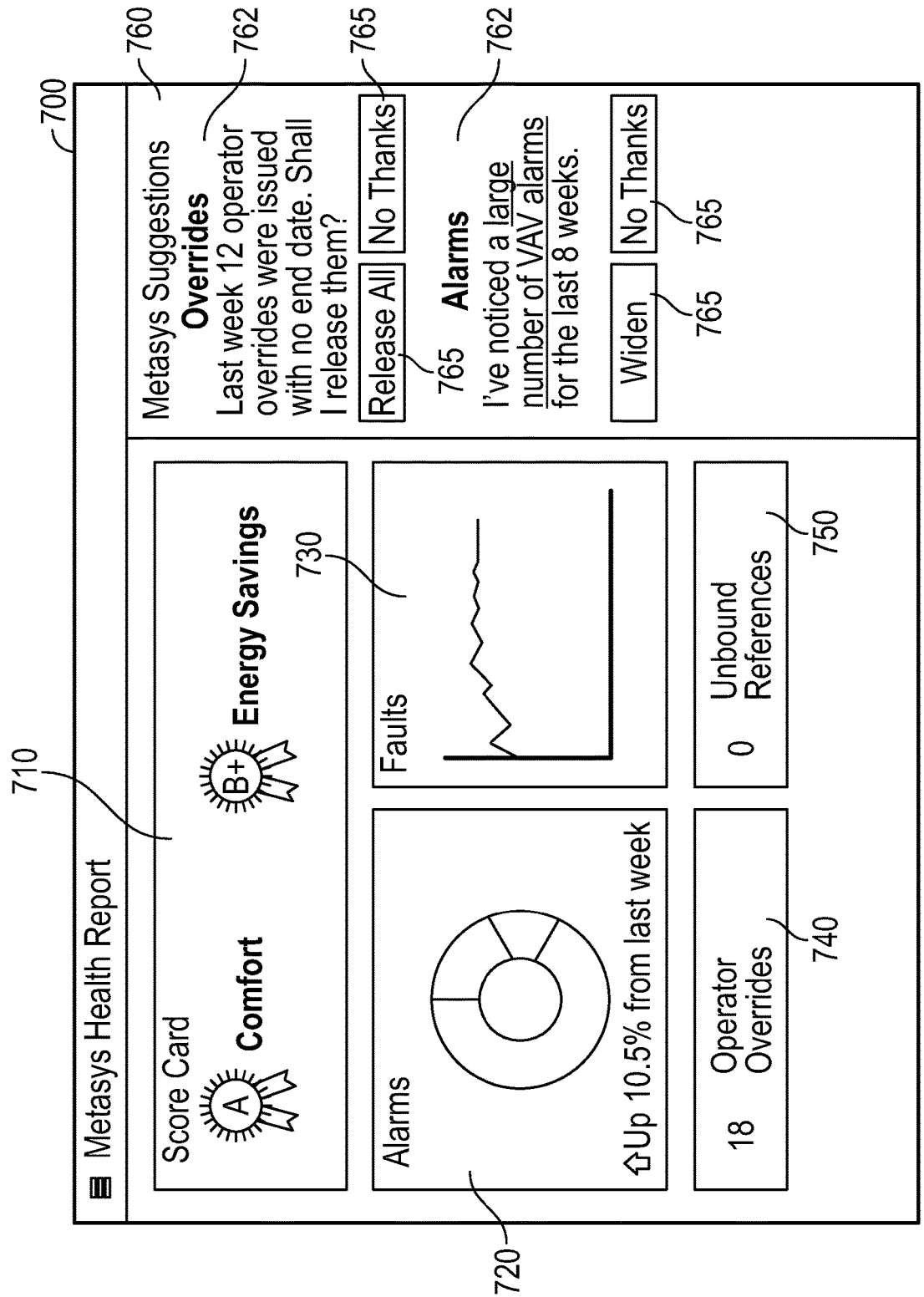
FIG. 7 is a user interface of the operator automation controller of FIG. 6, according to some embodiments.

Referring now specifically to FIG. 7, health report 700 is shown, according to an exemplary embodiment. Interface 450 may include health report 700. In various embodiments, health report 700 is a dashboard to display an overview of the operation of BMS 500. Health report 700 may include multiple modules 710-760 to organize the display of different information. Scorecard module 710 may provide an "at-a-glance" overview of factors relating to the operation of BMS 500. For example, scorecard module 710 may display a comfort level associated with the operation of an HVAC system. Additionally or alternatively, scorecard module 710 may include an energy savings rating indicating an energy efficiency of BMS 500. Alarms module 720 may include an overview of alarm activity associated with BMS 500. In some embodiments, alarms module 720 displays alarm activity relating to a security system. Additionally or alternatively, alarms module 720 may display alarm activity related to an HVAC system (e.g., hot call event alarm), equipment alarms (e.g., service event alarm), a fire suppression system (e.g., smoke detector alarm), and/or other BMS related alarm activity.

Faults module 730 may display an overview of faults associated with BMS 500. For example, faults module 730 may display the number of recent equipment faults. In some embodiments, faults module 730 displays faults graphically (e.g., a plot of the number of faults over time, etc.). Overrides module 740 may display information relating to user overrides. For example, overrides module 740 may display the number of recent user overrides. Unbound references module 750 may display information relating to the number of unbound references associated with BMS 500. Suggestions module 760 may display actions 634. Actions 634 within suggestion module 760 may be grouped by category 765. For example, suggestions module 760 may include an override category 762 and an alarm category 762. Each category 762 may describe the associated actions 634 and may include one or more options 765 to receive user input. For example, a first option 765 may accept the associated action 634 and a second option 765 may reject the associated action 634. In various embodiments, the number, type, configuration, and/or information included in each of modules 710-760 is customizable. For example, a user may rearrange modules 710-760 (e.g., by dragging and dropping), or may delete a first module and replace it with a second module.

Referring now to FIG. 8, action interface 800 is shown, according to an exemplary embodiment. Interface 450 may include action interface 800. Action interface 800 may display actions 634 to a user. In various embodiments, retrieval service 640 retrieves and formats actions 634 for display. Action interface 800 may include one or more action items 810, each corresponding to one of actions 634. Action items 810 may be organized according to priority or creation date. Action items 810 include title 812, category 814, date 816, equipment 818, and options 820. A user may cause operator automation controller 600 to execute one of actions 634 via options 820. For example, a user may select a "run" option from options 820 to cause action administrator 612 to execute the associated action 634. Additionally or alternatively, a user may delete or dismiss actions 634 via options 820. In various embodiments, in response to a user deleting or dismissing one of actions 634, database management service 630 may update a "dismissed date" associated with action 634. In various embodiments, the "dismissed date" may determine when action 634 is displayed to a user. In various embodiments, operator automation controller 600 executes queries 636 to develop new actions 634 to display via action interface 800.

Figure 9:
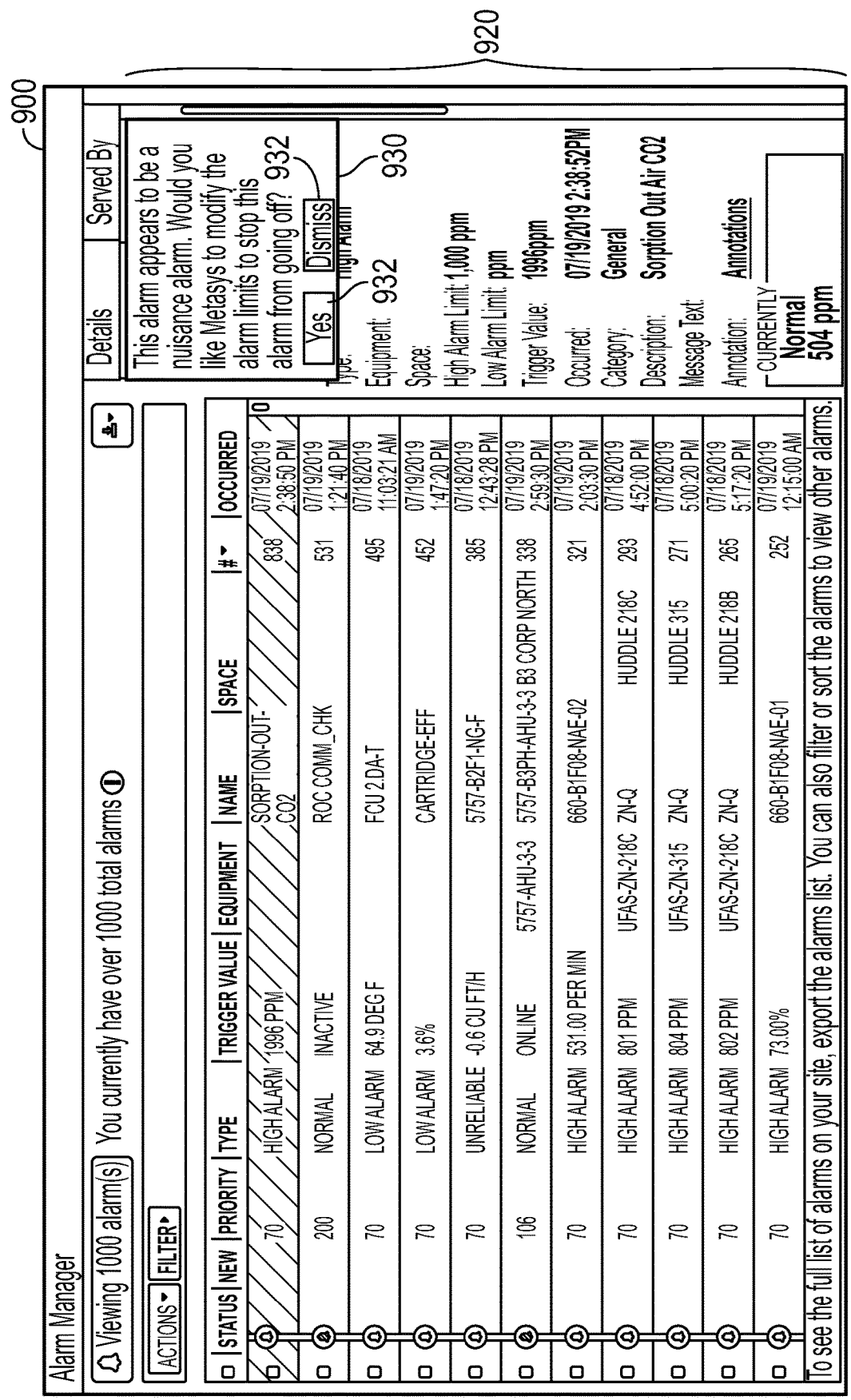
FIG. 9 is another interface of the operator automation controller of FIG. 6 including one or more alarms, according to some embodiments.

Referring now to FIGS. 9-9A, alarm manager interface 900 is shown, according to an exemplary embodiment. Alarm manager interface 900 may display a number of alarms associated with BMS 500. Interface 450 may include alarm manager interface 900. Alarm manager interface 900 includes alarm section 910 and details section 920. Alarm section 910 may include information associated with one or more BMS alarms. For example, alarm section 910 may include HVAC alarms, equipment alarms, security system alarms, fire suppression system alarms, and any other alarms associated with BMS 500. Alarm section 910 includes alarms 912. In some embodiments, alarms 912 are displayed as a list. Alarms 912 may include information associated with the alarm. For example, alarms 912 may include a priority, a type, a trigger value, associated equipment, a name, an associated space, an alarm number, and/or a time and date. Details 920 may display detailed information relating to alarms 912. In some embodiments, alarm manager interface 900 includes suggestion 930. Operator automation controller 600 may display suggestion 930 based on user interaction with alarm manager interface 900. For example, a user may select one of alarms 912 and operator automation controller 600 may determine that the alarm is a nuisance alarm and display a suggestion 930 to modify the alarm limits to prevent future nuisance alarms. Suggestion 930 may include actions 634. Suggestion 930 may include a description of the action suggested and one or more options 932. A user may accept or reject suggestion 930 via options 932. Additionally or alternatively, options 932 may facilitate different actions. For example, a user may view more information about suggestion 930 via options 932. In some embodiments, as shown in FIG. 9A, suggestion 930 is a pop-up. For example, suggestion 930 may be displayed upon opening alarm manager interface 900. Additionally or alternatively, suggestion 930 may be displayed in response to BMS alarms. For example, BMS 500 may create a new high temperature alarm and operator automation controller 600 may display suggestion 930 to respond to the high temperature alarm.

Figure 10:
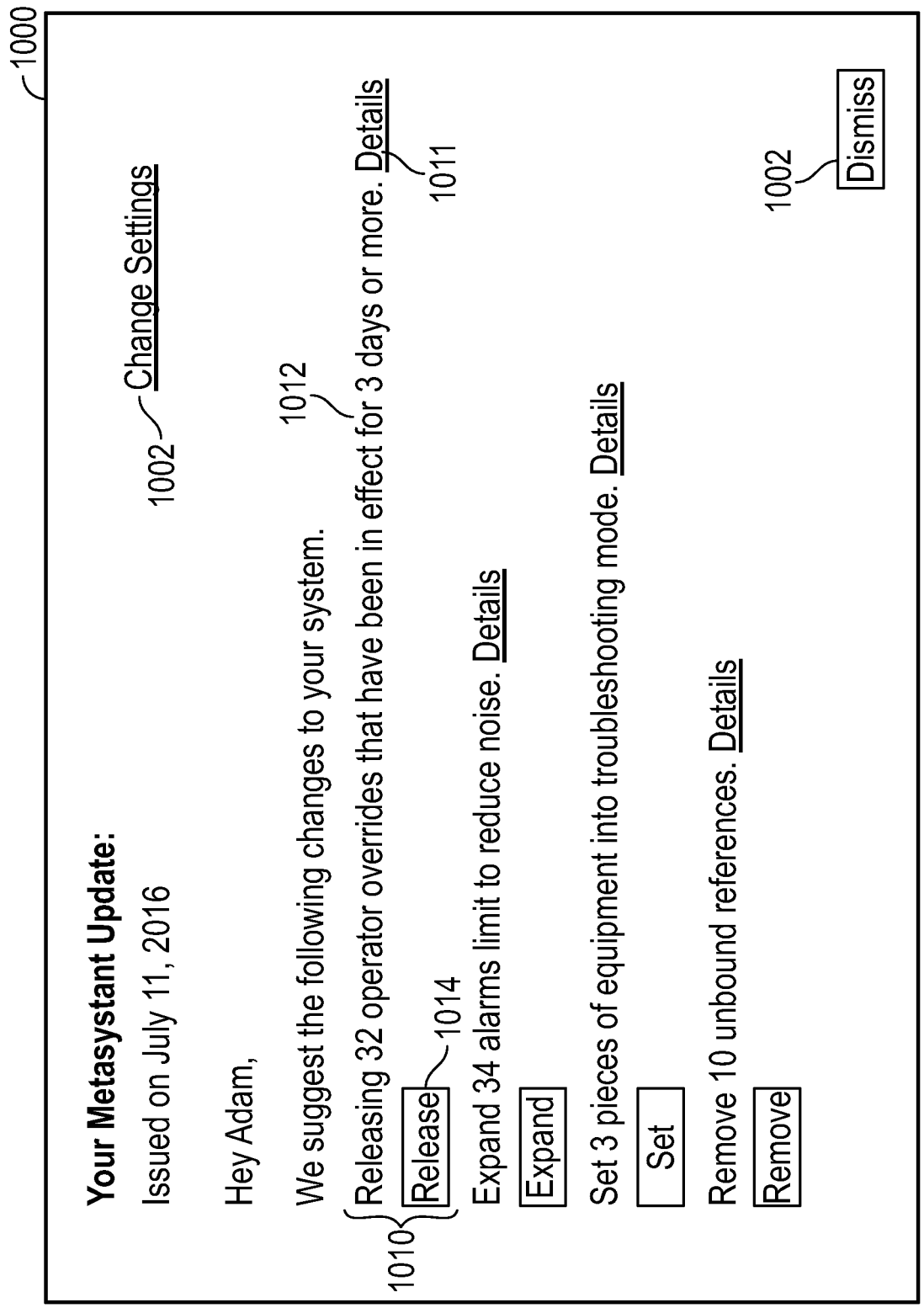
FIG. 10 is another interface of the operator automation controller of FIG. 6 including one or more suggestions, according to some embodiments.
Figure 10A:
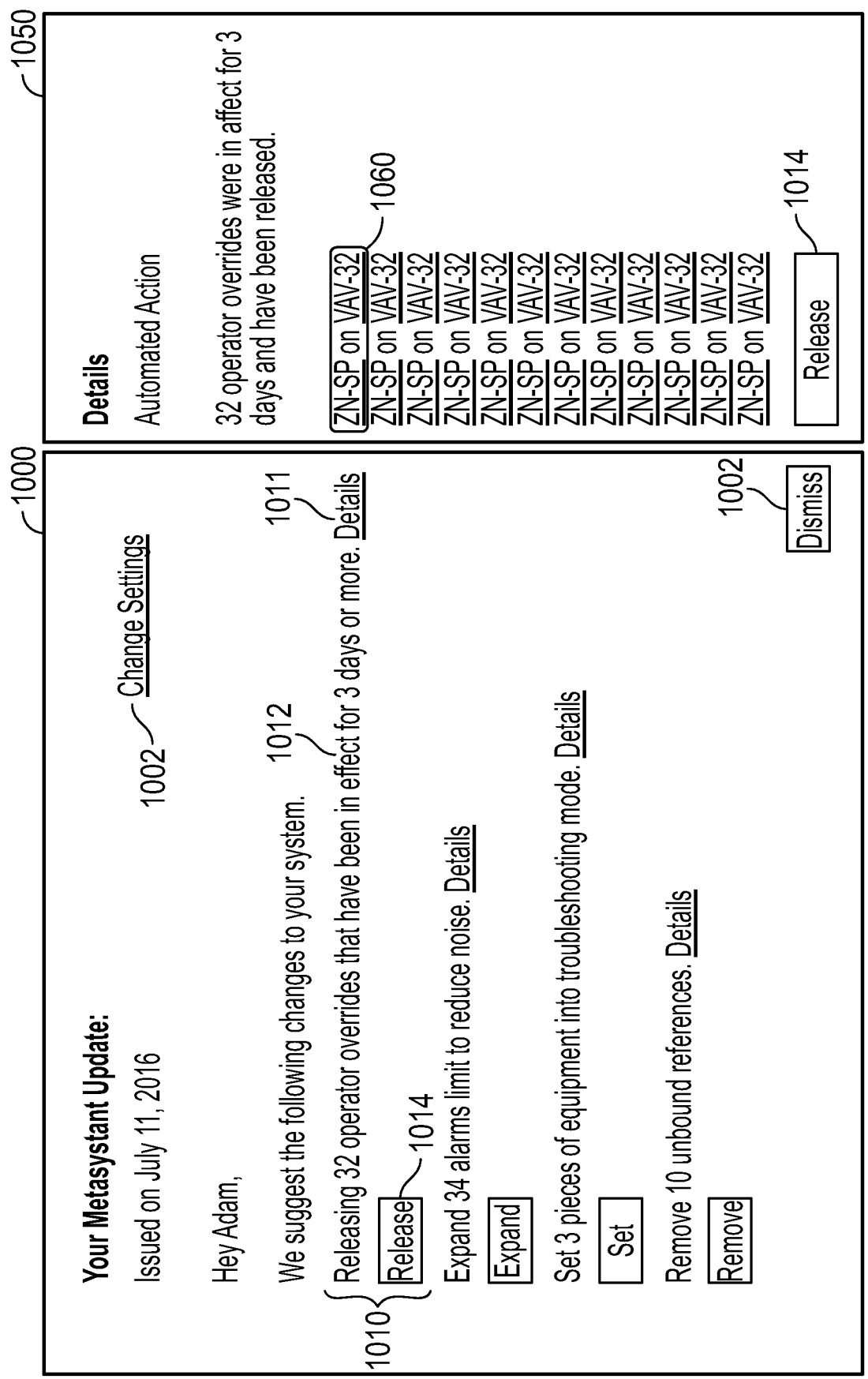
FIG. 10A is the interface of FIG. 10 including action details, according to some embodiments.
Figure 10B:
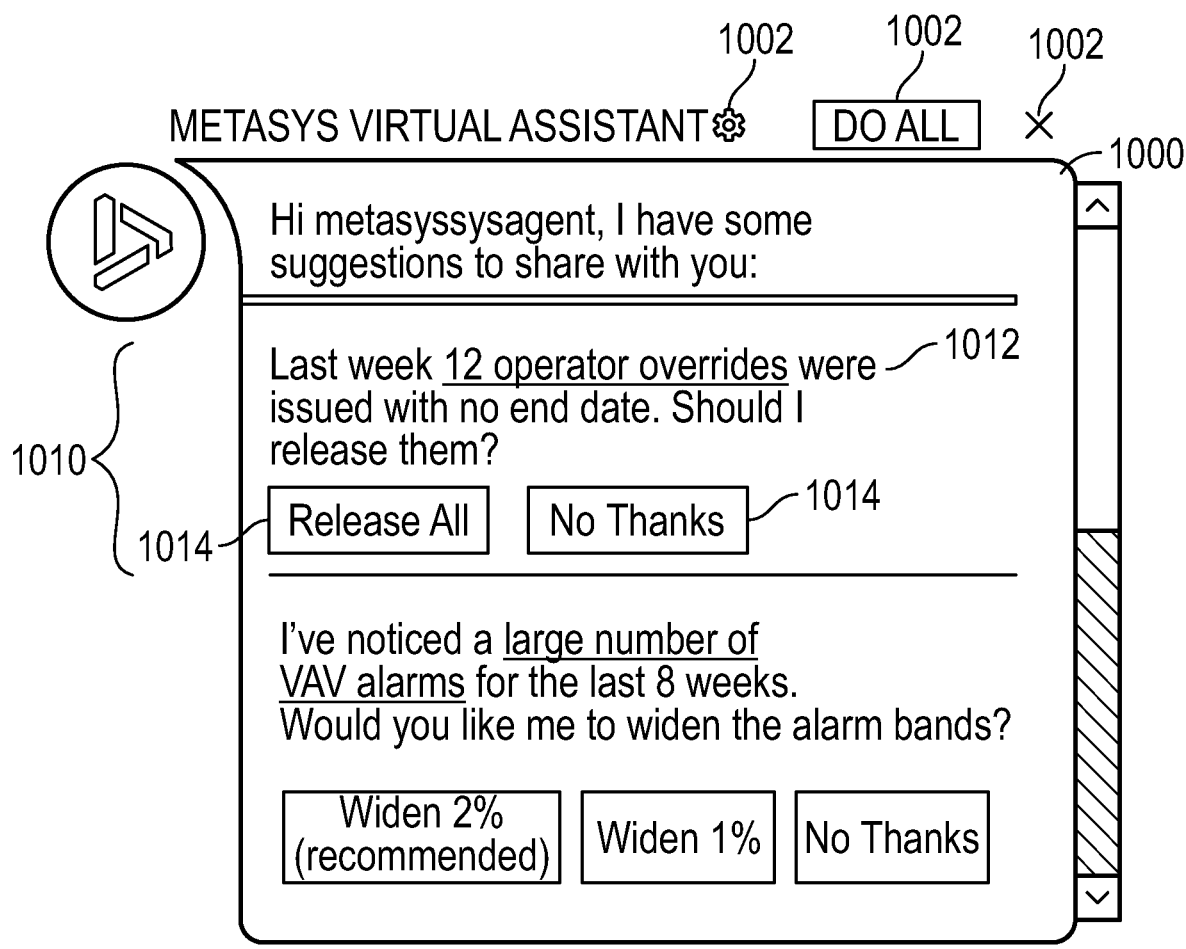
FIG. 10B is a pop-up interface of the operator automation controller of FIG. 6, according to some embodiments.

Referring now to FIGS. 10-10B, several exemplary embodiments of suggestion 1000 are shown. Similar to suggestion 930, suggestion 1000 may be displayed by operator automation controller 600. In some embodiments, operator automation controller 600 analyzes BMS database 490 (e.g., via passive layer 616) to determine actions 634, and displays the actions 634 via suggestion 1000. In some embodiments, suggestion 1000 is displayed as a welcome message to interface 450. For example, operator automation controller 600 may display suggestion 1000 when a user first opens interface 450. Additionally or alternatively, suggestion 1000 may be displayed as part of any other user interface of BMS 500. Suggestion 1000 is shown to include one or more options 1002. A user may interact with suggestion 1000 via options 1002. For example, a user may select one of options 1002 to dismiss suggestion 1000. Additionally or alternatively, as shown in FIG. 10B, a user may access operator automation controller 600 settings via options 1002. Suggestion 1000 includes one or more items 1010. Each of items 1010 may be associated with one of actions 634. For example, a first item 1010 may relate to releasing one or more stale user overrides. Items 1010 may include description 1012, details 1011, and one or more options 1014. A user may select one of options 1014 to execute each of items 1010. In some embodiments, operator automation controller 600 may populate options 1014 based on the learned behavior of the user. For example, operator automation controller 600 may display a first option 1014 to widen an alarm limit by 2% based on previous user responses to similar alarms and may display a second option 1014 to widen the alarm limit by 1% based on an analysis of the alarm. In some embodiments, selection of details 1011 displays details interface 1050. Details interface 1050 may display detailed information for actions 634 associated with each of items 1010. For example, details 1011 may include a list of every user override that operator automation controller 600 suggests releasing. Details interface 1050 may include one or more points 1060. Points 1060 may describe a BMS object associated with actions 634. For example, suggestion 1000 to release a VAV override may include one or more points 1060 corresponding to each suggested VAV override release.

Figure 11:
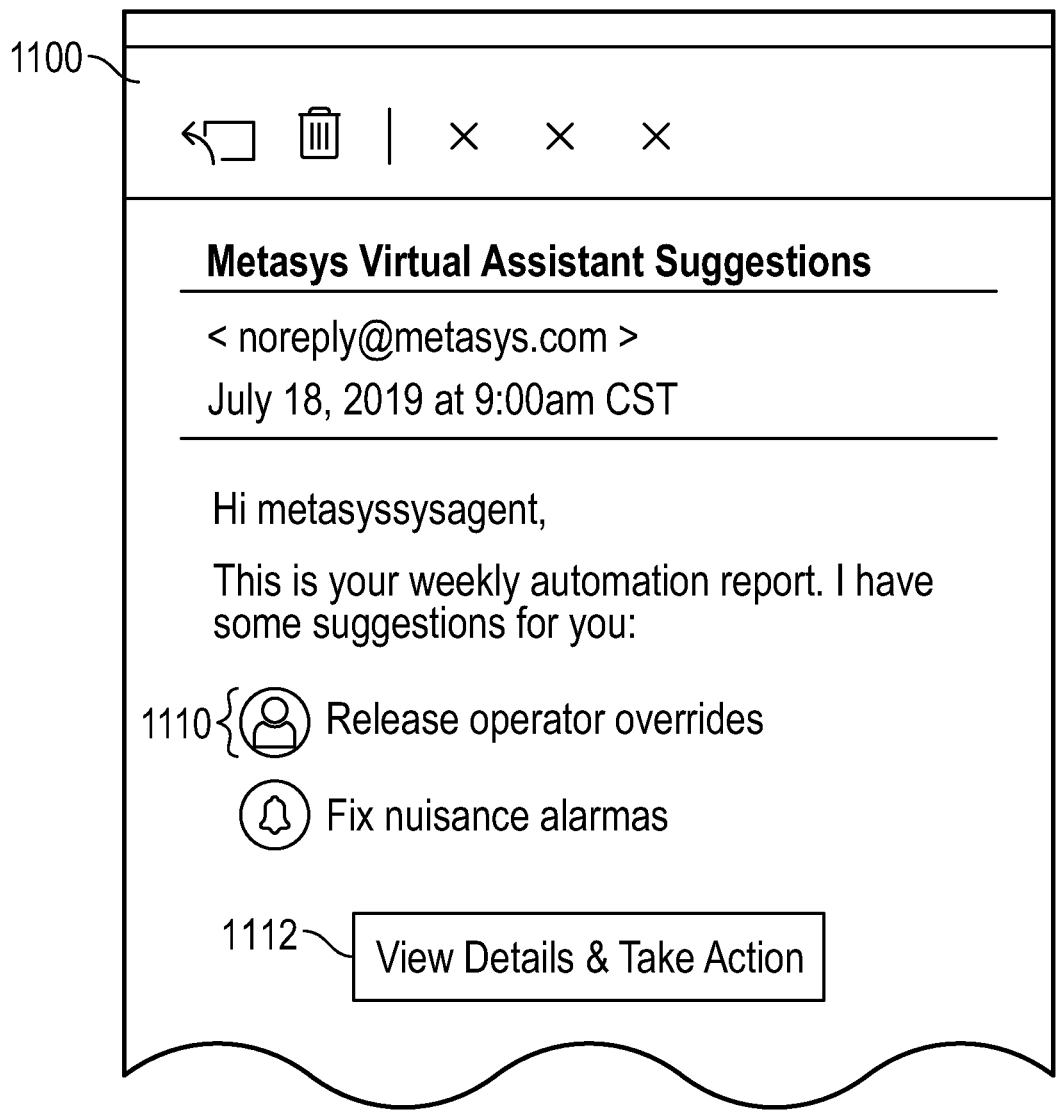
FIG. 11 is an email interface of the operator automation controller of FIG. 6 including one or more suggestions, according to some embodiments.

Referring now to FIG. 11, email suggestion 1100 is shown, according to an exemplary embodiment. Email suggestion 1100 may be an email form of suggestion 1000. In some embodiments, operator automation controller 600 generates and sends email suggestion 1100 daily. For example, operator automation controller 600 may send email suggestion 1100 to a user each morning. In some embodiments, a user determines the destination of email suggestion 1100 via settings as described below in reference to FIGS. 14-14A. Similar to suggestion 1000, email suggestion 1100 includes one or more items 1110. Each of items 1110 may be associated with one of actions 634. For example, a first item 1110 may relate to releasing one or more stale user overrides. Items 1110 may be associated with actions 634. Email suggestion 1100 may include option(s) 1112. Option(s) 1112 may include a link to open one or more interfaces of BMS 500 and/or operator automation controller 600. For example, option(s) 1112 may cause suggestion 1000 to open and display details interface 1050 to display details associated with action 634. In some embodiments, the link is a HTML link. Additionally or alternatively, the link may include executable code instructions such as JavaScript or PHP.

Figure 12:
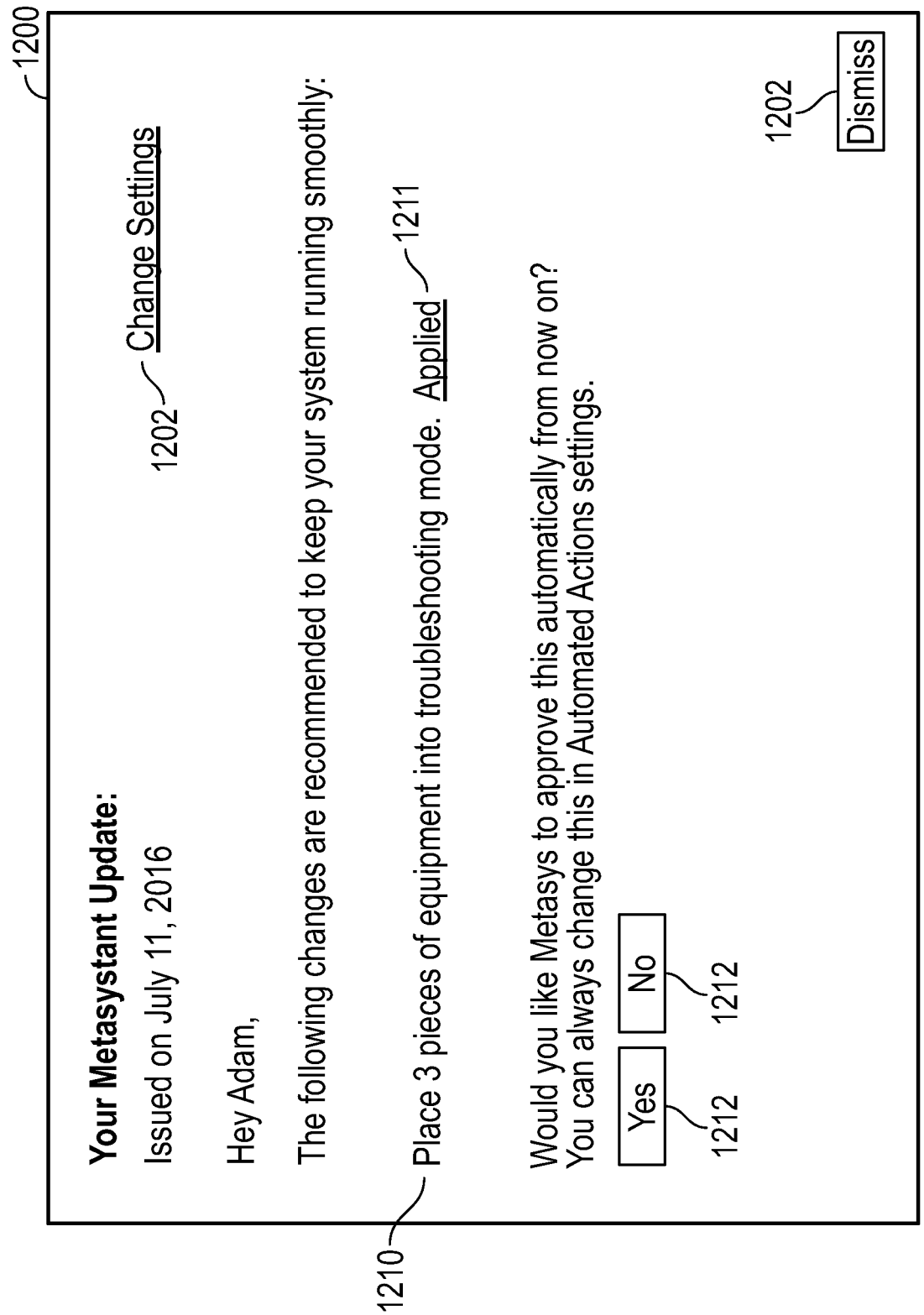
FIG. 12 is another interface of the operator automation controller of FIG. 6 including one or more suggestions, according to some embodiments.

Referring now to FIG. 12, automation request 1200 is shown, according to an exemplary embodiment. In various embodiments, operator automation controller 600 displays automation request 1200 before performing user-automated functions (e.g., actions 634). For example, operator automation controller 600 may display automation request 1200 before replicating one or more user actions in response to a BMS alarm. A user may configure the operation of operator automation controller 600 via automation request 1200. For example, a user may allow operator automation controller 600 to automate future actions (e.g., execute actions 634) without having to prompt the user for permission. In various embodiments, automation request 1200 is generated in response to a request from pattern recognition service 620 and/or recommendation generator 615. For example, pattern recognition service 620 may determine that a user silences a door alarm every week and may prompt the user via automation request 1200 to automatically silence the door alarm from now on. In some embodiments, operator automation controller 600 displays automation request 1200 in response to one of actions 634. For example, audit service 635 may determine that HVAC equipment is throwing erroneous alarms and operator automation controller 600 may display an action 634 to place the HVAC equipment into troubleshooting mode.

Automation request 1200 is shown to include one or more items 1210. Each of items 1210 describes an action 634. In some embodiments, items 1210 include status 1211. Status 1211 may indicate the status of items 1210. For example, one of items 1210 may relate to automatically silencing HVAC alarms and status 1211 may indicate whether the associated HVAC alarms are currently silenced. A user may accept or reject items 1210 via options 1212. For example, a user may allow automation of one or more of items 1210 via options 1212. Additionally or alternatively, a user may reject automation of one or more of items 1210 via options 1212. In some embodiments, automation request 1200 includes options 1202. Options 1202 may facilitate dismissing automation request 1200 and/or changing settings associated with operator automation controller 600 and/or automation request 1200.

Referring now to FIG. 13, summary 1300 is shown, according to an exemplary embodiment. Summary 1300 may provide an overview of recent actions 634 taken by operator automation controller 600. For example, summary 1300 may display actions 634 executed in the last 3 days. Similar to automation request 1200, summary 1300 may include options 1302 to facilitate input from a user. A user may dismiss summary 1300 via options 1302 and/or change settings associated with operator automation controller 600 and/or summary 1300. For example, a user may select one of options 1302 to display an interface to facilitate changing a frequency with which operator automation controller 600 displays summary 1300. Summary 1300 is shown to include one or more items 1310. Items 1310 may describe actions 634 performed by operator automation controller 600. In various embodiments, each of items 1310 are associated with at least one of actions 634. In some embodiments, items 1310 include details 1311. A user may select details 1311 to view additional details associated with items 1310. For example, selection of details 1311 may display a time and date associated with the execution of the associated one or more actions 634.

Figure 14:
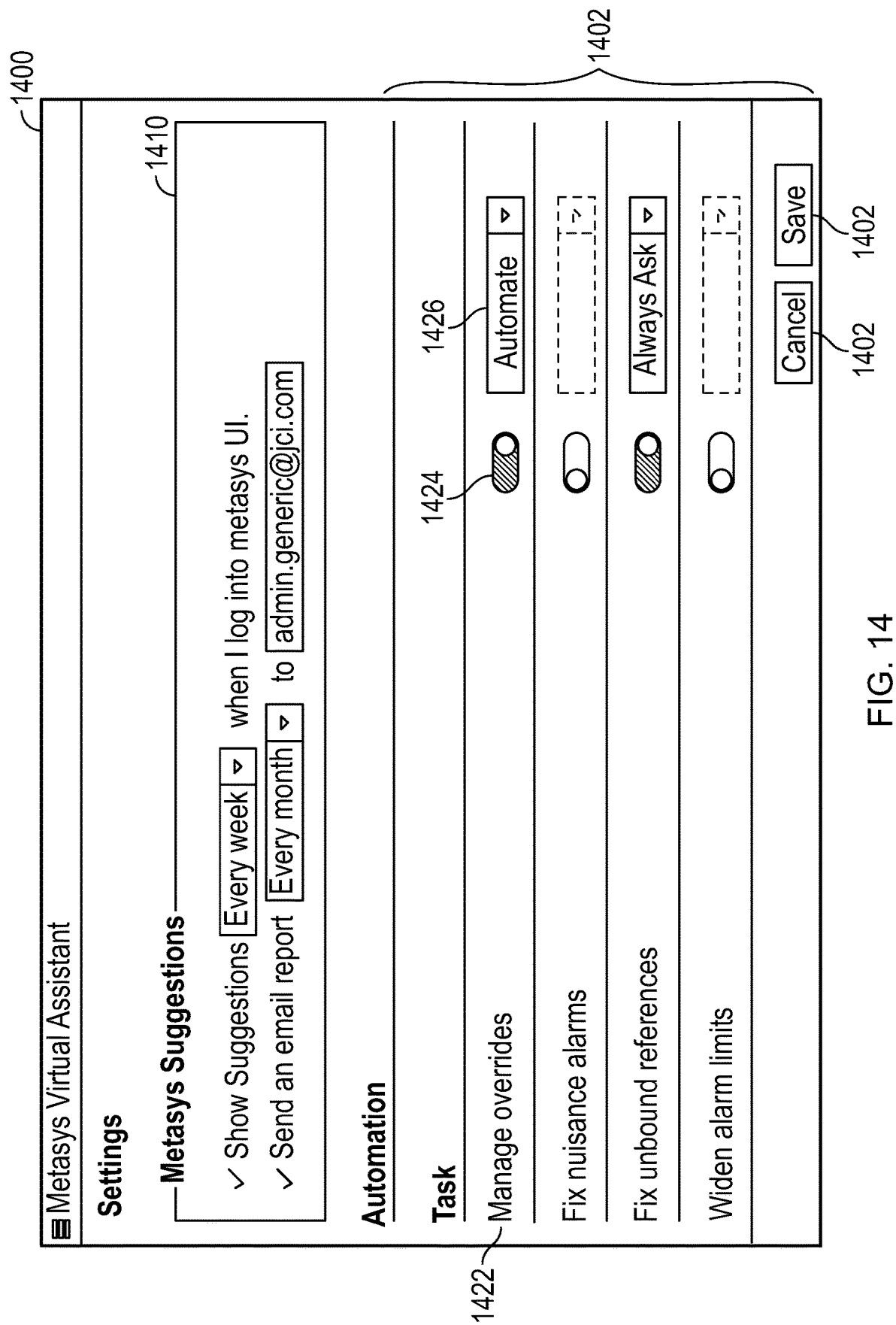
FIG. 14 is a settings interface of the operator automation controller of FIG. 6, according to some embodiments.
Figure 14A:
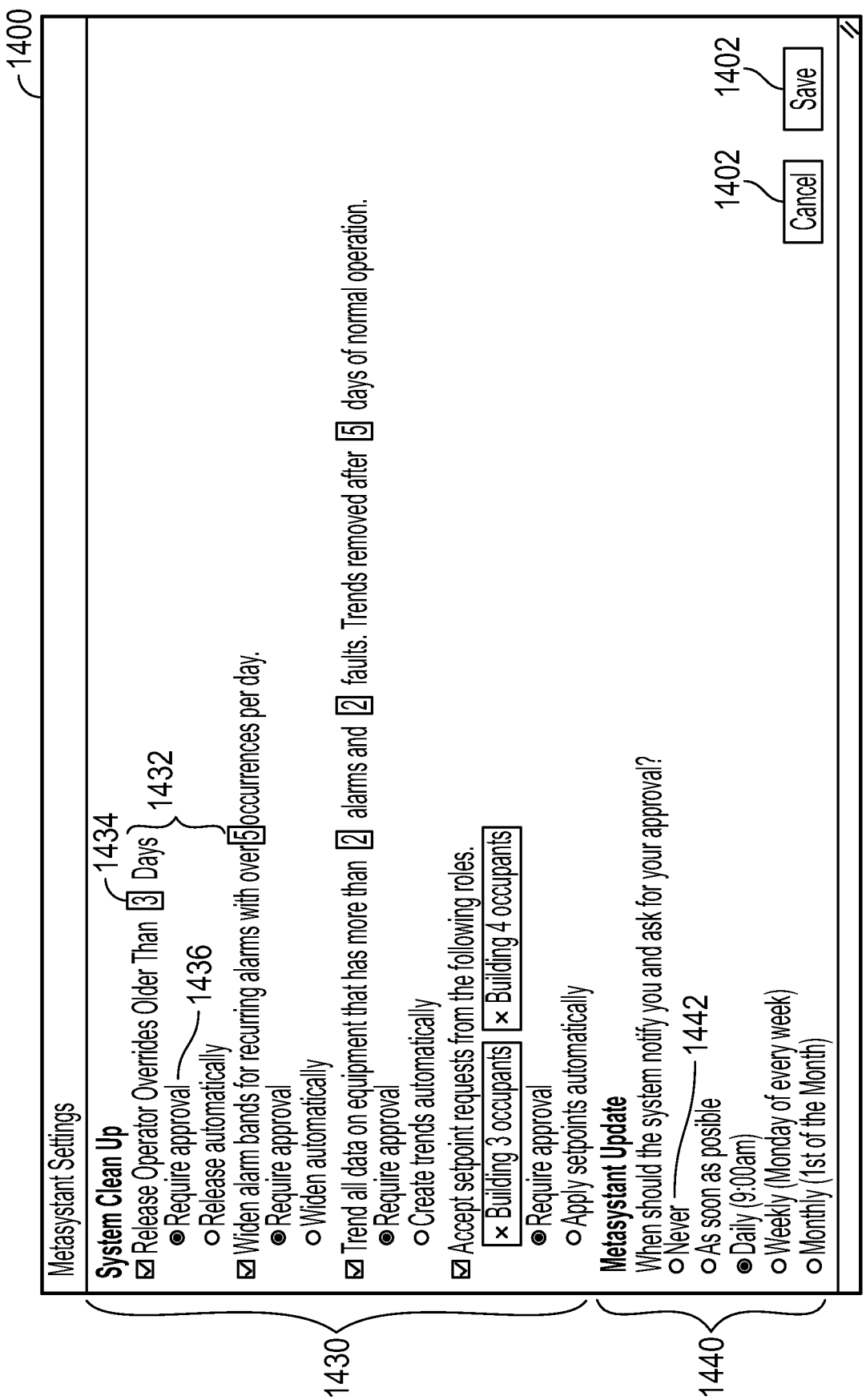
FIG. 14A is another settings interface of the operator automation controller of FIG. 6, according to some embodiments.

Referring now to FIGS. 14-14A, settings interface 1400 is shown, according to an exemplary embodiment. Settings interface 1400 may facilitate a user to configure operator automation controller 600. For example, a user may configure an email address to receive email suggestion 1100 via settings interface 1400. Additionally or alternatively, a user may determine a "level" of automation via settings interface 1400. For example, a user may configure operator automation controller 600 to automate various actions without prompting the user. In various embodiments, settings interface 1400 is organized by category. Settings interface 1400 may include one or more options 1402. For example, options 1402 may include a "save" option and a "cancel" option.

Settings interface 1400 is shown to include suggestions settings 1410 and automation settings 1420. Suggestions settings 1410 may display settings associated with suggestions displayed by operator automation controller 600 (e.g., suggestion 1000, email suggestion 1100, etc.). In some embodiments, a user may change a frequency that suggestions (e.g., suggestion 1000, email suggestion 1100, etc.) are displayed via suggestions settings 1410. Additionally or alternatively, a user may determine a format of suggestions. For example, a user may decide to receive suggestions via an interface of BMS 500 and/or via email. Furthermore, a user may input an email address to receive suggestions (e.g., email suggestion 1100).

Automation settings 1420 may display settings associated with automated actions performed by operator automation controller 600. In various embodiments, automation settings 1420 may regulate the display of automation request 1200. For example, a user may configure operator automation controller 600 to display automation request 1200 before automating overrides but may configure operator automation controller 600 to automate fixing nuisance alarms without displaying automation request 1200. Automation settings 1420 may include tasks 1422. Tasks 1422 may be associated with one or more forms of automation. For example, a first task 1422 may relate to override automation and a second task 1422 may relate to alarm response automation. In some embodiments, tasks 1422 are associated with actions 634. Tasks 1422 may include enable option 1424 and dropdown 1426. A user may enable or disable each of tasks 1422 via enable option 1424. In some embodiments, a user may select a level of automation for tasks 1422 via dropdown 1426. The level of automation may correspond to an amount of user input involved in tasks 1422. For example, operator automation controller 600 may prompt a user before automatically responding to overrides but may respond to alarms without prompting the user.

In some embodiments, settings interface 1400 includes clean-up settings 1430. In some embodiments, clean-up settings 1430 configure the operation of passive layer 616. Operator automation controller 600 may generate queries 636 based on clean-up settings 1430. For example, clean-up settings 1430 may determine how often passive layer 616 queries BMS database 490 to generate actions 634. A user may specify parameters to configure the operation of operator automation controller 600 via clean-up settings 1430. For example, a user may specify that alarms older than 3 days should be cleared. As a further example, a user may specify that operator automation controller 600 should widen alarm limits for alarms that occur more than 5 times per day. Clean-up settings 1430 may include one or more items 1432 corresponding to parameters of operation. For example, a first item 1432 may be associated with releasing user overrides and a second item 1432 may be associated with widening alarm bands. In some embodiments, a user may specify various parameters via parameter 1434. For example, a user may specify that user overrides older than 3 days should be released. Items 1432 may include one or more options 1436. A user may require operator automation controller 600 to receive approval from the user before performing automation (e.g., via options 1436).

In some embodiments, settings interface 1400 includes update settings 1440. A user may specify an update schedule for operator automation controller 600 and/or BMS 500 via update settings 1440. For example, a user may specify that updates should occur weekly. Update settings 1440 may include one or more options 1442. A user may specify update schedules (e.g., never, as soon as possible, daily, weekly, monthly, etc.) by selecting one of options 1442.

Figure 15:
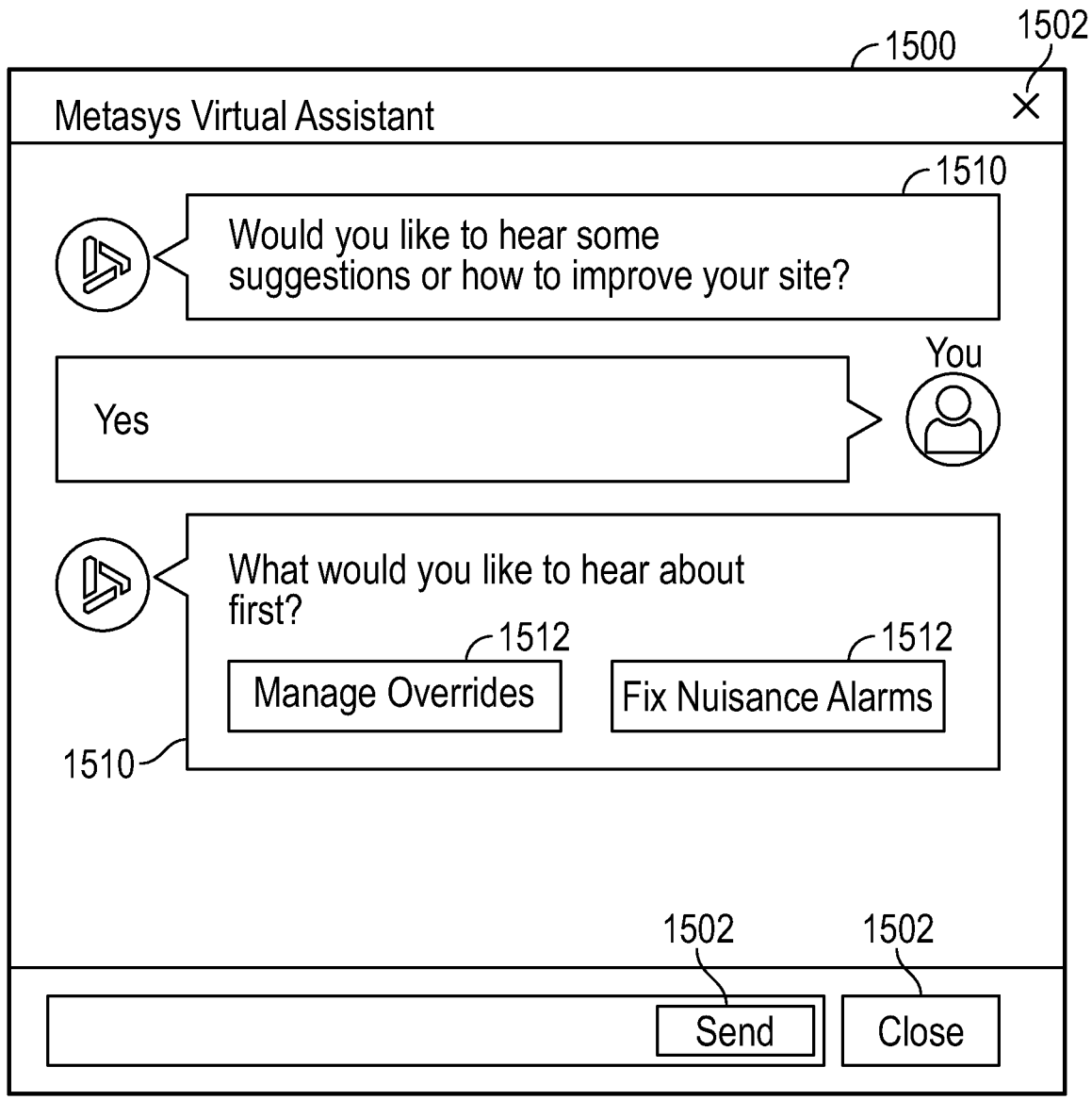
FIG. 15 is a chatbot interface of the operator automation controller of FIG. 6, according to some embodiments.

Referring now to FIG. 15, chatbot 1500 is shown, according to an exemplary embodiment. In various embodiments, chatbot 1500 interfaces with natural language processing 650. For example, a user, via chatbot 1500 may interact with operator automation controller 600 in a conversational manner. In various embodiments, the user may ask operator automation controller 600 questions via chatbot 1500 and natural language processing 650 may respond as a human would. For example, a user may type a question to chatbot 1500 and chatbot 1500 may respond to the user's question. Chatbot 1500 may facilitate operation of operator automation controller 600 and/or BMS 500. For example, a user may fix nuisance alarms via chatbot 1500. Systems and methods of conversational interaction with a BMS are described in detail with reference to U.S. application Ser. No. 16/028,126, titled "Systems and Methods for Conversational Interaction with a Building Automation System," filed Jul. 5, 2018, the entirety of which is incorporated by reference herein.

In some embodiments, chatbot 1500 includes one or more options 1502. Options 1502 may facilitate user interaction with chatbot 1500. For example, a first option 1502 may facilitate sending messages to chatbot 1500 and a second option 1502 may facilitate closing chatbot 1500. In various embodiments, chatbot 1500 interacts with a user via messages 1510. Messages 1510 may be text-based messages. Additionally or alternatively, messages 1510 may be voice-based messages. In various embodiments, natural language processing 650 facilitates generation of messages 1510. In some embodiments, messages 1510 includes one or more options 1512. Options 1512 may be associated with actions 634. For example, a first option 1512 may be associated with a first action 634 to silence nuisance alarms. In some embodiments, selection of options 1512 may cause one or more actions 634 to execute. Additionally or alternatively, selection of options 1512 may display one or more interfaces.

Referring now to FIG. 17, override interface 1600 is shown, according to an exemplary embodiment. Override interface 1600 may display one or more user overrides associated with operator automation controller 600 and/or BMS 500. In various embodiments, override interface 1600 displays a list of user overrides. The list may include parameters such as items, values, associated equipment, and associated spaces. Override interface 1600 may include one or more options 1602. In some embodiments, a user may release one or more user overrides via options 1602. Override interface 1600 may include one or more items 1610. Each of items 1610 may be associated with a user override. Items 1610 may include release option 1612. Selection of release option 1612 may release the user override associated with the specific item 1610.

Referring now to FIGS. 17-17A, activity interface 1700 is shown, according to an exemplary embodiment. Activity interface 1700 may display activity associated with operator automation controller 600 and/or BMS 500. For example, activity interface 1700 may display recent actions 634 executed by operator automation controller 600. In some embodiments, activity interface 1700 includes list 1710 of activity. Activities display by activity interface 1700 may include adjusting set points, releasing user overrides, system logins, adjusting alarm bands, scheduling equipment, trending equipment, and/or any other activity associated with operator automation controller 600 and/or BMS 500. List 1710 may include one or more action items 1712. In some embodiments, each of action items 1712 are associated with actions 634. Activity interface 1700 may display one or more parameters associated with action items 1712. For example, activity interface 1700 may display a date, a time, a type, a description, a value, and/or spaces/equipment associated with the action items 1712.

In some embodiments, selection of action items 1712 displays details 1750. Details 1750 may display detailed information associated with action items 1712. For example, details 1750 may display a description of action items 1712 and/or a list of equipment associated with action items 1712. In some embodiments, details 1750 includes one or more elements 1760. Elements 1760 may describe BMS equipment and/or objects associated with action items 1712. For example, elements 1760 may describe a VAV setting associated with an action item 1712 to change a temperature set point. Elements 1760 may include parameter 1762 and/or equipment 1764. Equipment 1764 may identify a BMS component. Additionally or alternatively, equipment 1764 may describe a BMS object such as a user account. In some embodiments, a user may select parameter 1762 and/or equipment 1764 to view more information. In some embodiments, details 1750 includes one or more options 1752. Options 1752 may facilitate a user to execute action items 1712. For example, a user may select one of options 1752 to release user overrides associated with one of action items 1712.

Figure 18:
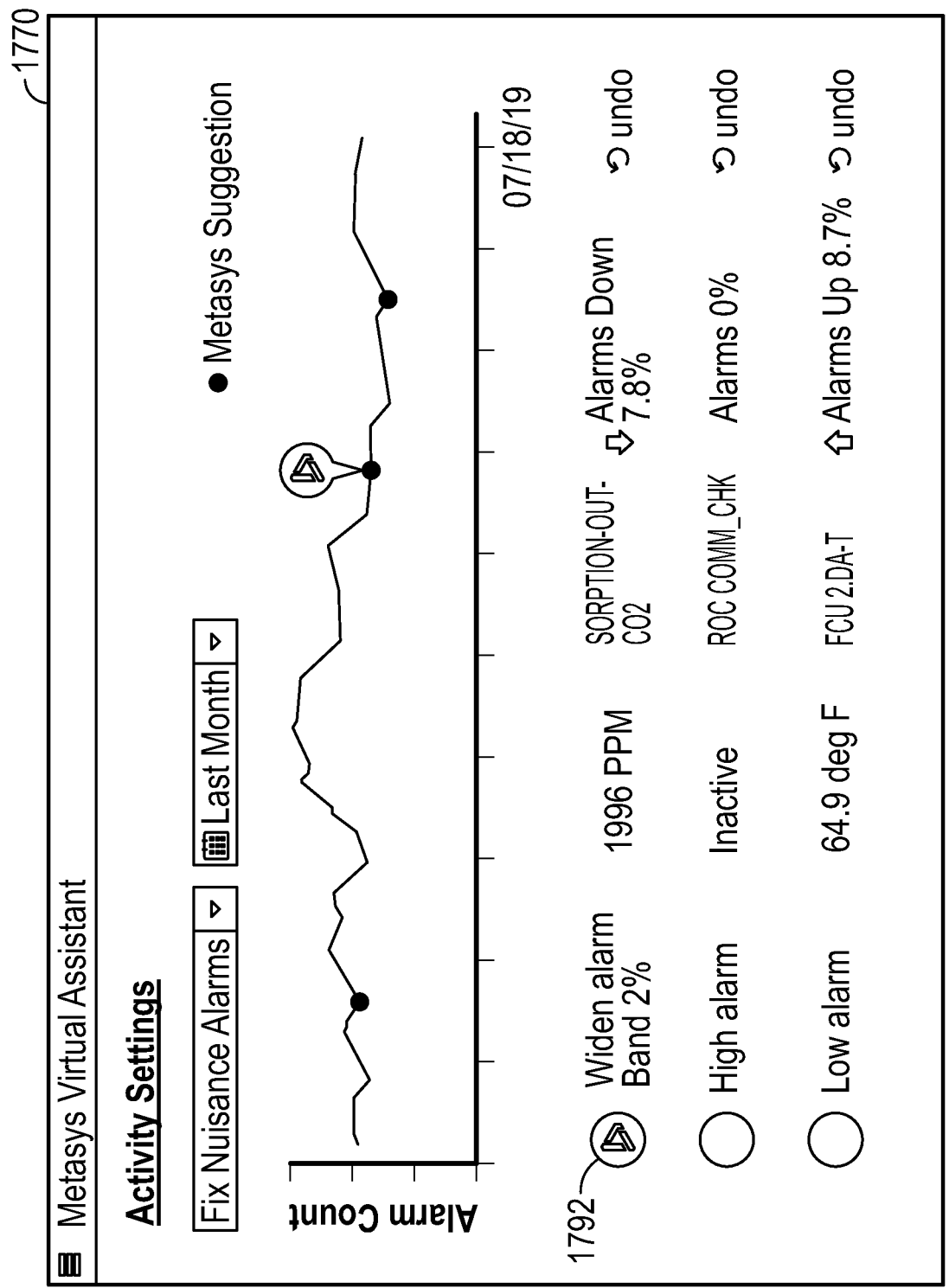
FIG. 18 is an activity settings interface of the operator automation controller of FIG. 6, according to some embodiments.

Referring now to FIG. 18, activity details 1770 is shown, according to an exemplary embodiment. In some embodiments, activity details 1770 is part of activity interface 1700. For example, a user may display activity details 1770 by double-clicking on one of action items 1712. Activity details 1770 may display detailed information associated with action items 1712. For example, activity details 1770 may display a plot depicting the impact of operator automation controller 600 automation over time. In various embodiments, activity details 1770 includes one or more action items 1792. Action items 1792 may be the same as action items 1712.

Active and Passive Automation

Referring now generally to FIGS. 19-27, methods of active and passive automation are described in detail, according to several exemplary embodiments. Operator automation controller 600 may be configured to perform active and passive automation (e.g., via active layer 614 and passive layer 616, etc.). Active automation may refer to analyzing user interaction with BMS 500 to learn how to respond to BMS events as a user would. In various embodiments, active automation replaces actions typically taken by a user. For example, operator automation controller 600 may automate silencing nuisance alarms as the user would. Active automation may include generating actions 634. Passive automation may refer to analyzing BMS 500 and/or BMS database 490, finding problems associated with BMS 500, and generating actions 634 to address the problems. For example, operator automation controller 600 may query BMS database 490 to determine BMS equipment that is untrended and suggest trending it. In various embodiments, passive and active automation are combined via operator automation controller 600 to reduce user workload and prevent alarm fatigue. Operator automation controller 600 may free users of BMS 500 from routine and/or reoccurring tasks by responding as the user would.

Figure 19:
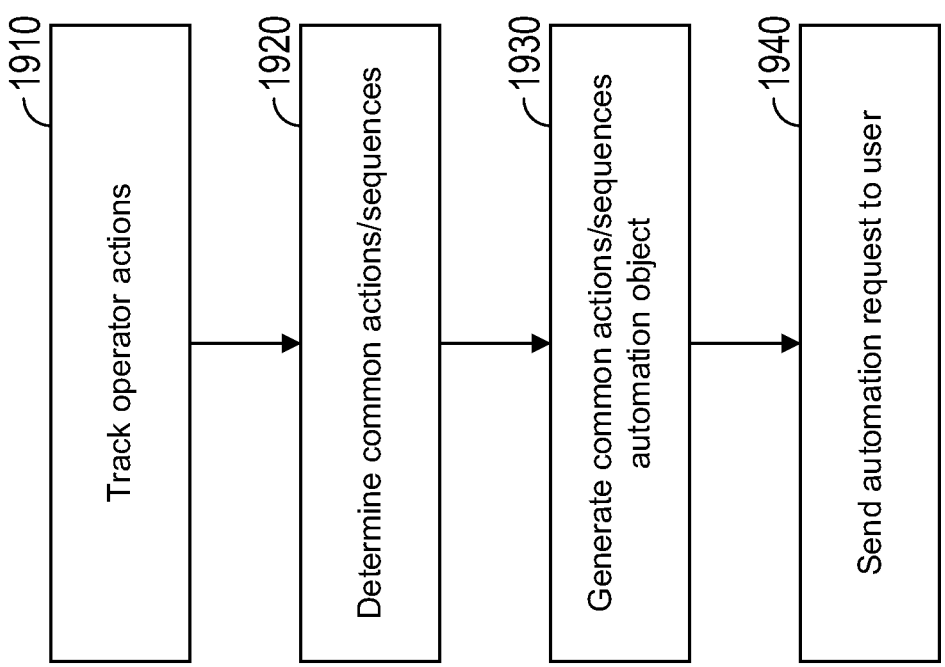
FIG. 19 is a flowchart of a process of active automation, according to some embodiments.

Referring now to FIG. 19, a method of performing active automation is shown, according to an exemplary embodiment. In various embodiments, active automation is performed by active layer 614. At step 1910, operator automation controller 600 may track user actions. Tracking user actions may include receiving and analyzing user input to BMS 500. For example, operator automation controller 600 may receive user input to BMS 500 in parallel with BMS 500. In various embodiments, step 1910 includes classifying and storing user actions. For example, operator automation controller 600 may receive a first user action to change a temperature set point and may classify and save the action as a "temperature set point change." In some embodiments, user actions are assigned a numerical classification. Additionally or alternatively, user actions may be classified according to a hierarchy. For example, operator automation controller 600 may classify a first user action to change a temperature set point as "HVAC:temperature:parameter:setpoint:increase."

At step 1920, operator automation controller 600 may determine common actions/sequences associated with the user actions. In various embodiments, pattern recognition service 620 performs step 1920. Pattern recognition service 620 may be or include machine learning or artificial intelligence algorithms to facilitate pattern recognition. In various embodiments, step 1920 includes comparing saved BMS data (e.g., previous operator actions, etc.). For example, operator automation controller 600 may determine a user commonly silences VAV alarms for a specific building.

At step 1930, operator automation controller 600 generates actions 634. In various embodiments, recommendation generator 615 generates actions 634 based on input from pattern recognition service 620. Action 634 may include the common action/sequences determined in step 1920. In various embodiments, actions 634 facilitates reproduction of the common action/sequence determined in step 1920 by operator automation controller 600. For example, operator automation controller 600 may execute action 634 to reproduce a user action. In various embodiments, operator automation controller 600 may use actions 634 to respond to BMS events as a user would. For example, operator automation controller 600 may generate an action 634 based on the typical user response to a door ajar alarm for a first door and use the action 634 to respond to a door ajar alarm for a second door.

At step 1940, operator automation controller 600 may send an automation request to a user. In various embodiments, the automation request may be a suggestion (e.g., suggestion 1000, email suggestion 1100, etc.). The automation request may include actions 634. Additionally or alternatively, a user may interact with action 634 via the automation request. For example, the automation request may include options to execute or delete the action 634 associated with the automation request.

Figure 20:
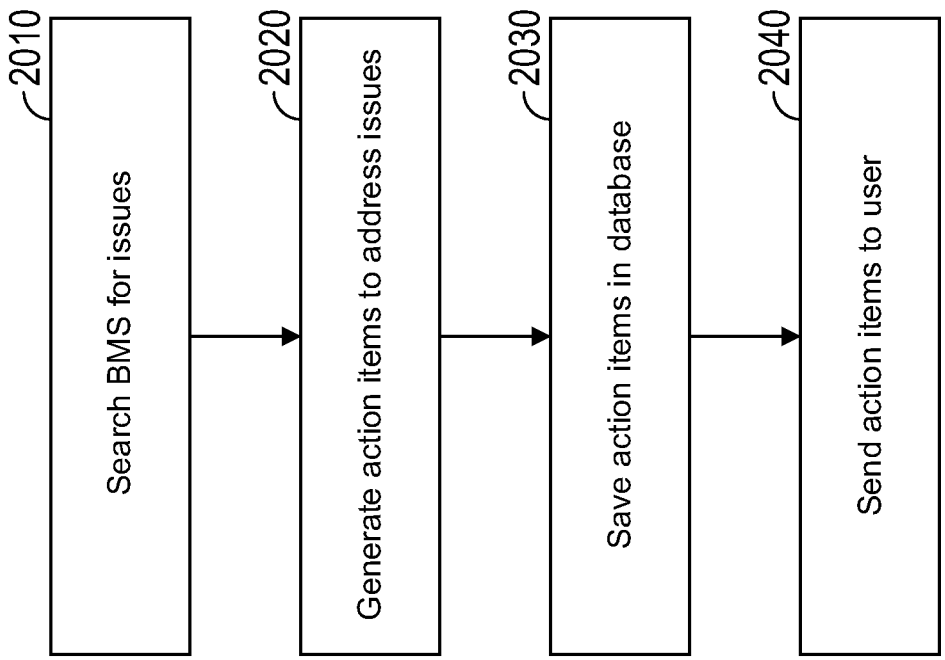
FIG. 20 is a flowchart of a process of passive automation, according to some embodiments.

Referring now to FIG. 20, a method of passive automation is shown, according to an exemplary embodiment. In various embodiments, passive layer 616 performs passive automation. At step 2010, operator automation controller 600 may search BMS 500 for problems. Problems may include untrended equipment, unscheduled equipment, user accounts with passwords set to never expire, equipment producing nuisance alarms, and/or other conditions associated with BMS 500. In some embodiments, problems are hard-coded (e.g., pre-programed, determined by a user, etc.). Additionally or alternatively, problems may be determined by operator automation controller 600 based on analyzing BMS 500. For example, active layer 614 may determine a user is commonly responding to VAV alarms and may indicate to passive layer 616 that the associated VAV is throwing nuisance alarms.

In various embodiments, step 2010 includes running queries 636 on BMS database 490. Audit service 635 may facilitate running queries 636 on BMS database 490. Queries 636 may facilitate determining problems with BMS 500. In some embodiments, queries 636 include search terms as inputs to a machine learning or artificial intelligence system to determine BMS data associated with the search terms. Additionally or alternatively, queries 636 may perform a binary search on BMS database 490. For example, operator automation controller 600 may search BMS database 490 using queries 636 to flag any BMS data associated with a search term.

At step 2020, operator automation controller 600 may generate actions 634 associated with the problems found in step 2010. For example, operator automation controller 600 may generate an action 634 to widen VAV alarm limits in response to determining a number of nuisance VAV alarms. In various embodiments, step 2020 is performed by audit service 635.

At step 2030, operator automation controller 600 may save actions 634 in action automation database 632. In various embodiments, database management service 630 facilitates saving actions 634. For example, database management service 630 may receive data and format the data as an action 634 before saving the action 634 in action automation database 632.

At step 2040, operator automation controller 600 may send actions 634 to a user. In various embodiments, operator automation controller 600 sends actions 634 to the user via a suggestion (e.g., suggestion 1000, email suggestion 1100, etc.). The automation request may include an action 634. Additionally or alternatively, a user may interact with action 634 via the automation request. For example, the automation request may include options to execute or delete the action 634 associated with the automation request.

Figure 21:
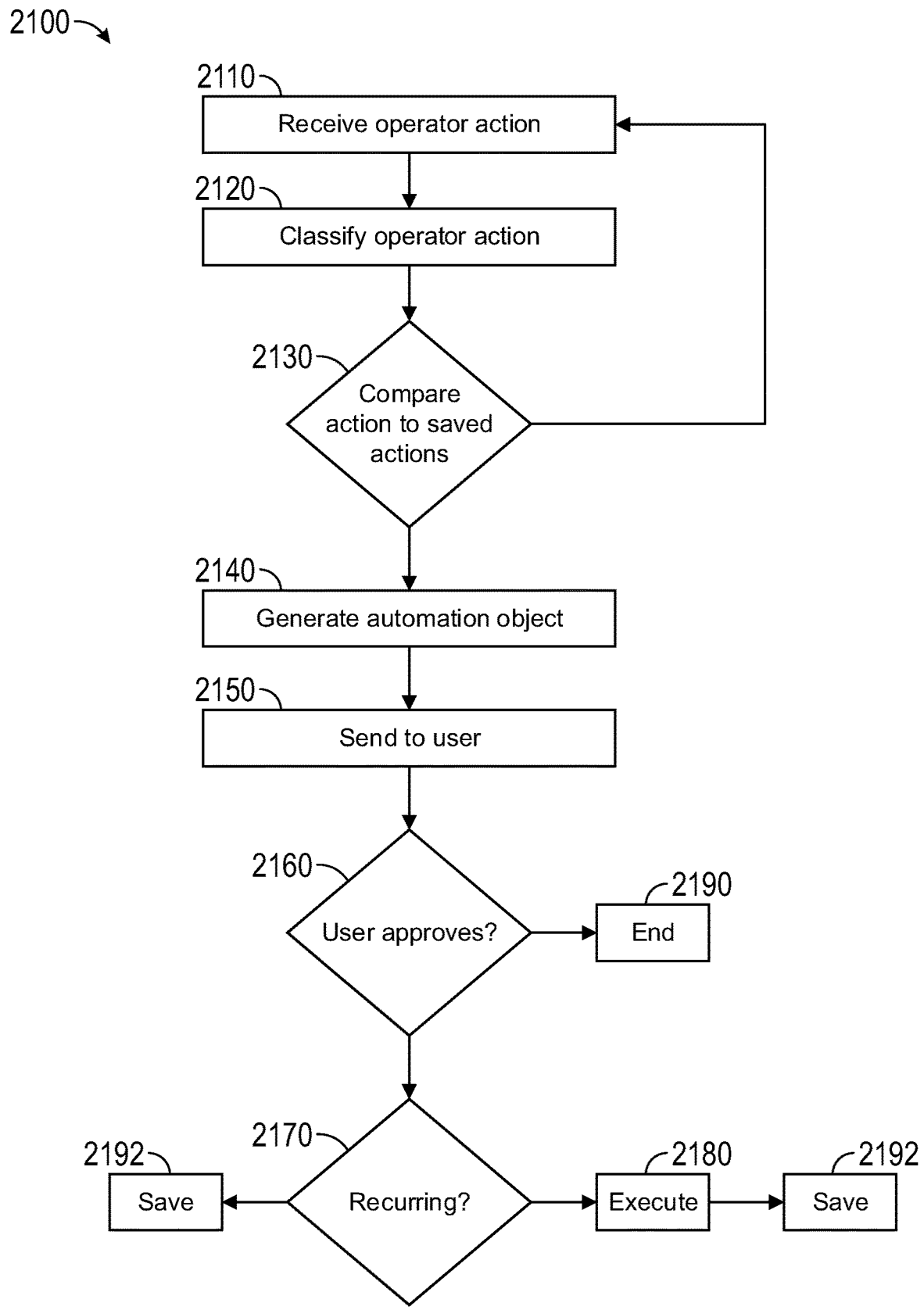
FIG. 21 is a flowchart for generating automation objects based on operator actions, according to some embodiments.

Referring now to FIG. 21, process 2100 for performing active automation is shown, according to an exemplary embodiment. In various embodiments, active layer 614 performs process 2100. At step 2110, operator automation controller 600 may receive BMS data describing a user action (e.g., a user silencing an alarm, etc.). In various embodiments operator automation controller 600 receives user inputs to BMS 500 in parallel with BMS 500. For example, operator automation controller 600 may receive a user request to change a temperature set point. At step 2120, operator automation controller 600 may classify the user action. For example, operator automation controller 600 may classify a user request to change a temperature set point as a "set point change." In some embodiments, operator automation controller 600 classifies user actions according to a hierarchy.

At step 2130, operator automation controller 600 compares the BMS data describing a user action to saved BMS data. Operator automation controller 600 may repeat steps 2110-2130 until a condition is met. For example, operator automation controller 600 may repeat steps 2110-2130 until a sufficient number of BMS data describing sufficiently similar user actions are classified and saved. Additionally or alternatively, if operator automation controller 600 determines a sufficient level of similarity between the BMS data describing the user action and saved BMS data, then it may perform step 2140. At step 2140, operator automation controller 600 may generate actions 634. At step 2150, operator automation controller 600 may send a request to approve actions 634 to a user. In various embodiments, operator automation controller 600 sends the request via an interface (e.g., automation request 1200).

At step 2160, the user may approve or reject the automation request (e.g., the request to execute actions 634). In various embodiments, the user approves or rejects the automation request via the interface (e.g., automation request 1200). If the user rejects the automation request, then the process may end without execution of actions 634 at step 2190. Additionally or alternatively, operator automation controller 600 may save actions 634 with a "date dismissed" date to indicate that the user rejected actions 634. If the user accepts the automation request, then then the process may proceed to step 2170. At step 2170, operator automation controller 600 may determine if the automation object is reoccurring. For example, an action 634 may relate to silencing a nuisance alarm weekly. In various embodiments, action 634 may include a field to indicate if the action is reoccurring. If the action is reoccurring, operator automation controller 600 may save the automation object (step 2192) for later reoccurring execution. The automation object may then execute on a specified schedule (e.g., daily, weekly, in response to an event, etc.). Additionally or alternatively, operator automation controller 600 may execute (step 2180) and save (step 2192) actions 634. In various embodiments, operator automation controller 600 executes (step 2180) actions 634 if the actions 634 are not reoccurring.

Figure 22:
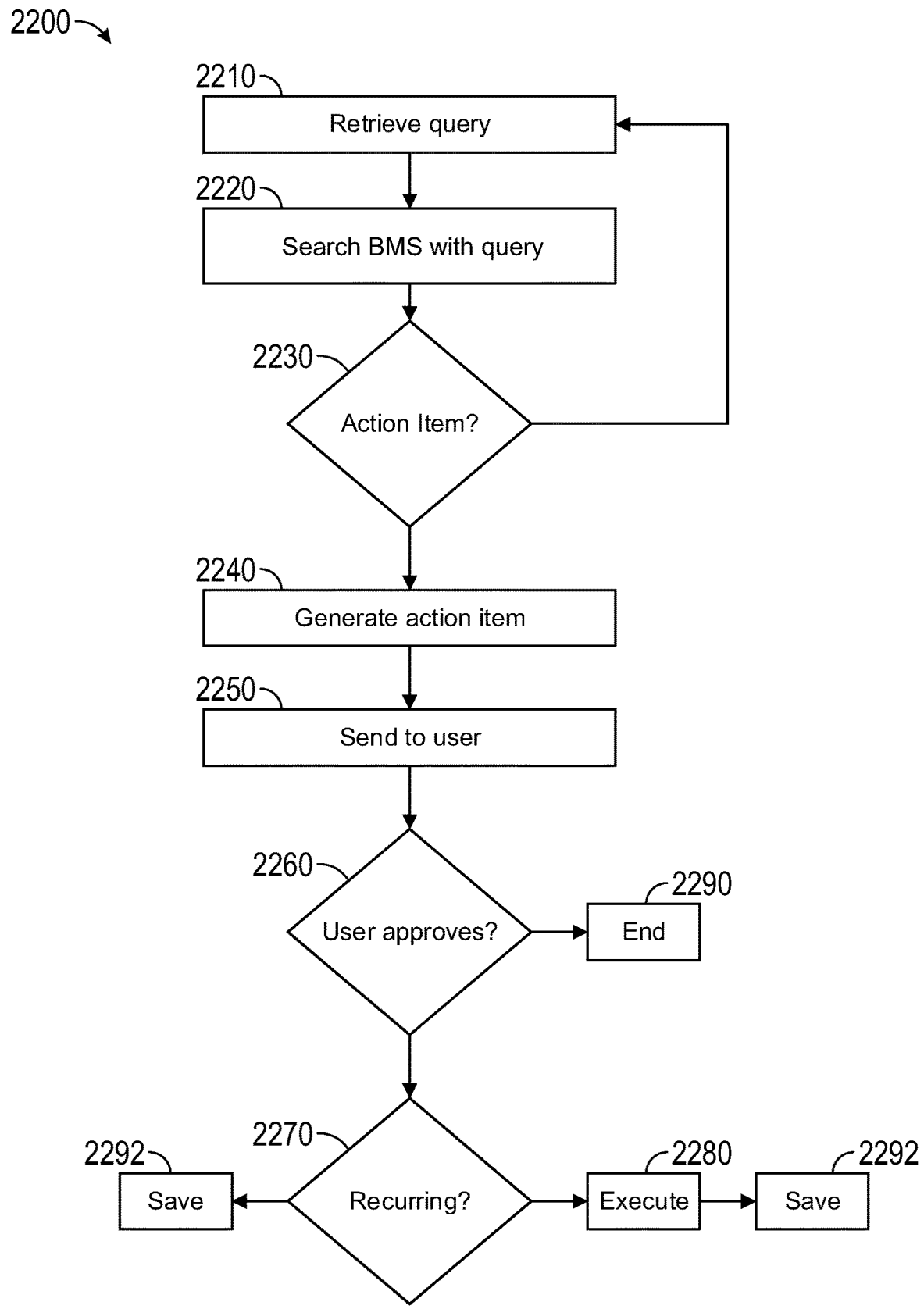
FIG. 22 is a flowchart for executing queries to generate action items, according to some embodiments.

Referring now to FIG. 22, process 2200 for performing passive automation is shown, according to an exemplary embodiment. In various embodiments, passive layer 616 performs process 2200. At step 2210, operator automation controller 600 may retrieve one or more queries 636 from action automation database 632. Queries 636 may be retrieved according to various parameters. For example, operator automation controller 600 may retrieve queries 636 based on creation date. At step 2220, audit service 635 may search BMS 500 with the retrieved queries 636. In various embodiments, searching BMS 500 with the retrieved queries 636 includes searching BMS database 490. Audit service 635 may search BMS 500 with one or more keywords included in queries 636. Additionally or alternatively, audit service 635 may use queries 636 as inputs to a machine-learning algorithm.

At step 2230, operator automation controller 600 finds a problem in BMS 500 to fix and determines if an existing action 634 addresses the issue. For example, operator automation controller 600 may determine a piece of HVAC equipment is untrended and may search through actions 634 to determine if any of the actions 634 relate to trending the untrended piece of HVAC equipment. In various embodiments, operator automation controller 600 may repeat steps 2210-2230 until a problem is found in BMS 500 without an existing action 634 to address the problem. For example, operator automation controller 600 may determine a temperature sensor is generating false high temperature alarms and that there is no action 634 to widen the alarm limits of the temperature sensor.

At step 2240, operator automation controller 600 may generate an action 634. In various embodiments, generating the action 634 includes populating the action fields as described in reference to FIG. 6. At step 2250, operator automation controller 600 may send the action 634 to a user. In various embodiments, operator automation controller 600 sends the action 634 to the user via an interface (e.g., action interface 800, automation request 1200, etc.).

At step 2260, the user may approve or reject the automation request (e.g., a request to execute actions 634). In various embodiments, the user approves or rejects the automation request via the interface (e.g., action interface 800, automation request 1200). If the user rejects the automation request, then the process may end without execution of action 634 at step 2290. Additionally or alternatively, operator automation controller 600 may save the action 634 with a "date dismissed" date to indicate that the action 634 was rejected by the user. If the user accepts the automation request, then then the process may proceed to step 2270. At step 2270, operator automation controller 600 may determine if the action 634 is reoccurring. For example, an action 634 may relate to silencing a nuisance alarm weekly. In various embodiments, action 634 may include a field to indicate if the action 634 is reoccurring. If the action 634 is reoccurring, operator automation controller 600 may save the action 634 (step 2292) for later reoccurring execution. The action 634 may then execute on a specified schedule (e.g., daily, weekly, in response to an event, etc.). Additionally or alternatively, operator automation controller 600 may execute (step 2280) and save (step 2292) the action 634. In various embodiments, operator automation controller 600 executes (step 2280) the action 634 if the action 634 is not reoccurring.

Figure 23:
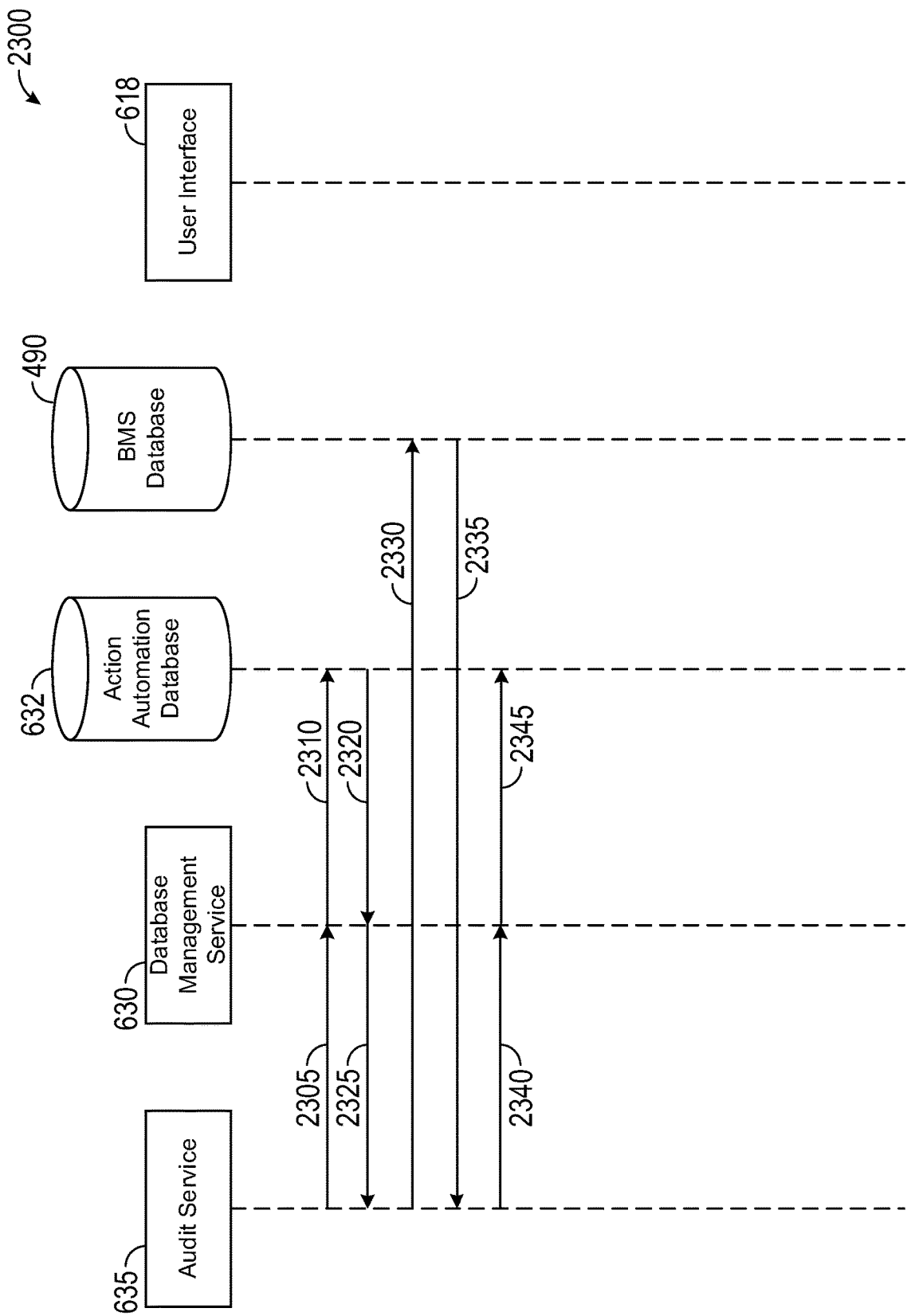
FIG. 23 is a dataflow diagram of retrieving and executing queries, according to some embodiments.

Referring now to FIG. 23, dataflow 2300 associated with passive automation is shown, according to an exemplary embodiment. At step 2305, audit service 635 requests one or more queries 636 from database management service 630. In some embodiments, audit service 635 requests queries 636 according to one or more parameters. For example, audit service 635 may request queries 636 according to a priority ranking (e.g., most important to least important). At step 2310, database management service 630 requests the one or more queries 636 from action automation database 632. At step 2320, action automation database 632 sends the one or more queries 636 to database management service 630. At step 2325, database management service 630 sends the one or more queries 636 to audit service 635. At step 2330, audit service 635 searches BMS database 490 using the one or more retrieved queries 636. In some embodiments, audit service 635 performs a keyword search of BMS database 490. Additionally or alternatively, audit service 635, may feed queries 636 into a machine-learning algorithm to search BMS database 490. At step 2335, BMS database 490 may send the results of the search performed in step 2330 to audit service 635. The results may include BMS data such as, configuration data, BMS equipment ID's, alarm data, and/or other BMS data. In response to receiving the results, audit service 635 may generate actions 634. At step 2340, audit service 635 may send the generated actions 634 to database management service 630. At step 2345, database management service 630 may save the generated actions 634 in action automation database 632.

Figure 24:
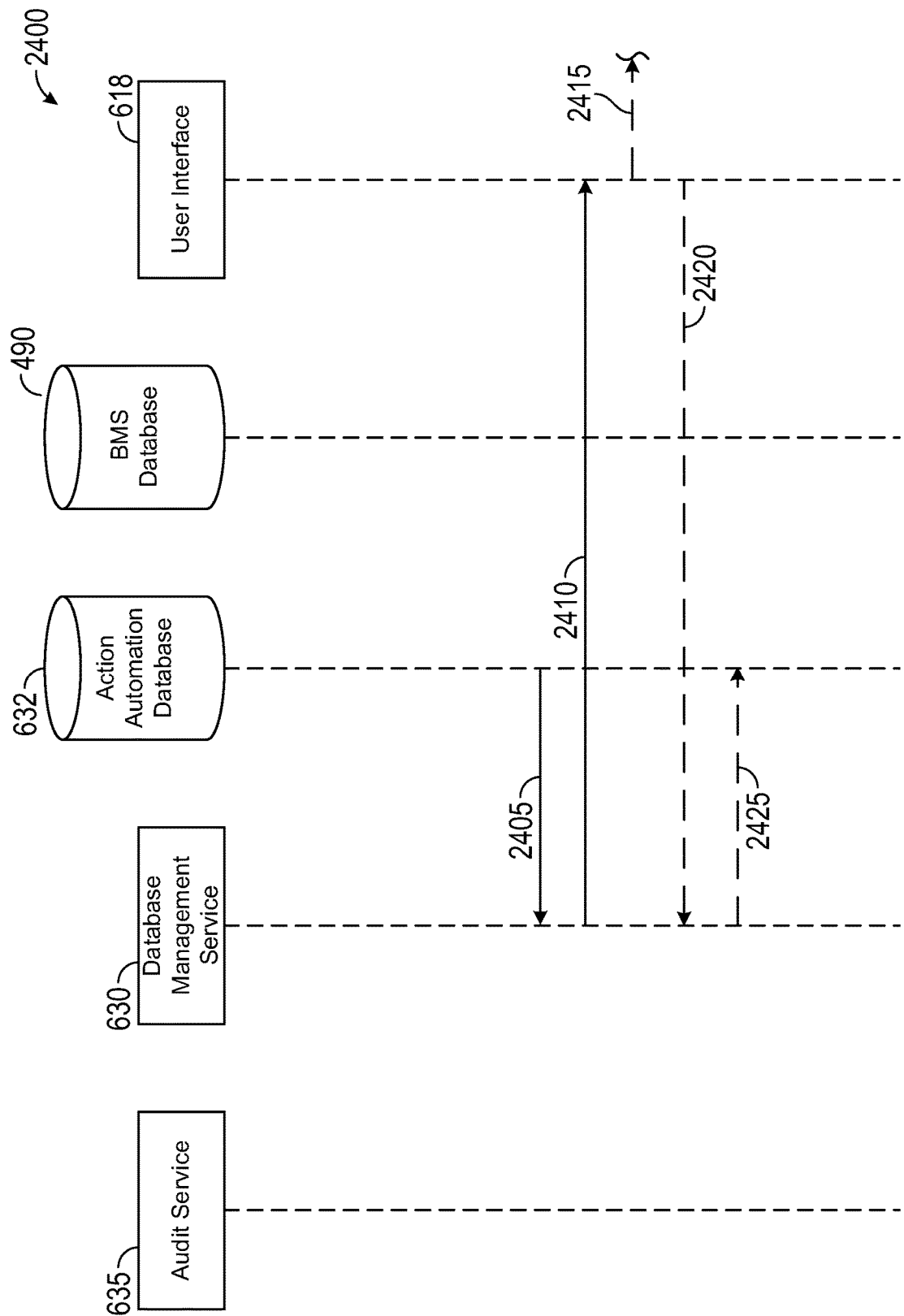
FIG. 24 is a dataflow diagram of generating and displaying action items based on executed queries, according to some embodiments.

Referring now to FIG. 24, dataflow 2400 associated with displaying actions 634 associated with passive automation to a user is shown, according to an exemplary embodiment. At step 2405, action automation database 632 sends one or more actions 634 to database management service 630. In some embodiments, step 2405 occurs in response to a request for actions 634. At step 2410, database management service 630 sends the actions 634 to user interface 618. In various embodiments, user interface 618 formats the actions 634 for display. For example, user interface 618 may generate automation request 1200 based on the actions 634. In various embodiments, user interface 618 is configured to display the actions 634 to the user. The user may accept or reject the actions 634. At step 2415, user interface 618 sends a message to execute the actions 634. In various embodiments, step 2415 is performed in response to receiving an indication from the user to execute the actions 634 (e.g., the user accepts the action). In some embodiments, at step 2420, user interface 618 sends an indication to update the actions 634 to database management service 630. Database management service 630 may update one or more attributes associated with the actions 634. For example, database management service 630 may update a "date dismissed" date of a specific action 634. At step 2425, database management service 630 sends an indication to update actions 634 to action automation database 632. The indication may include a description of which specific actions 634 to update and what attributes (e.g., parameters) to update. In response to receiving the indication from database management service 630, action automation database 632 may update actions 634.

Figure 25:
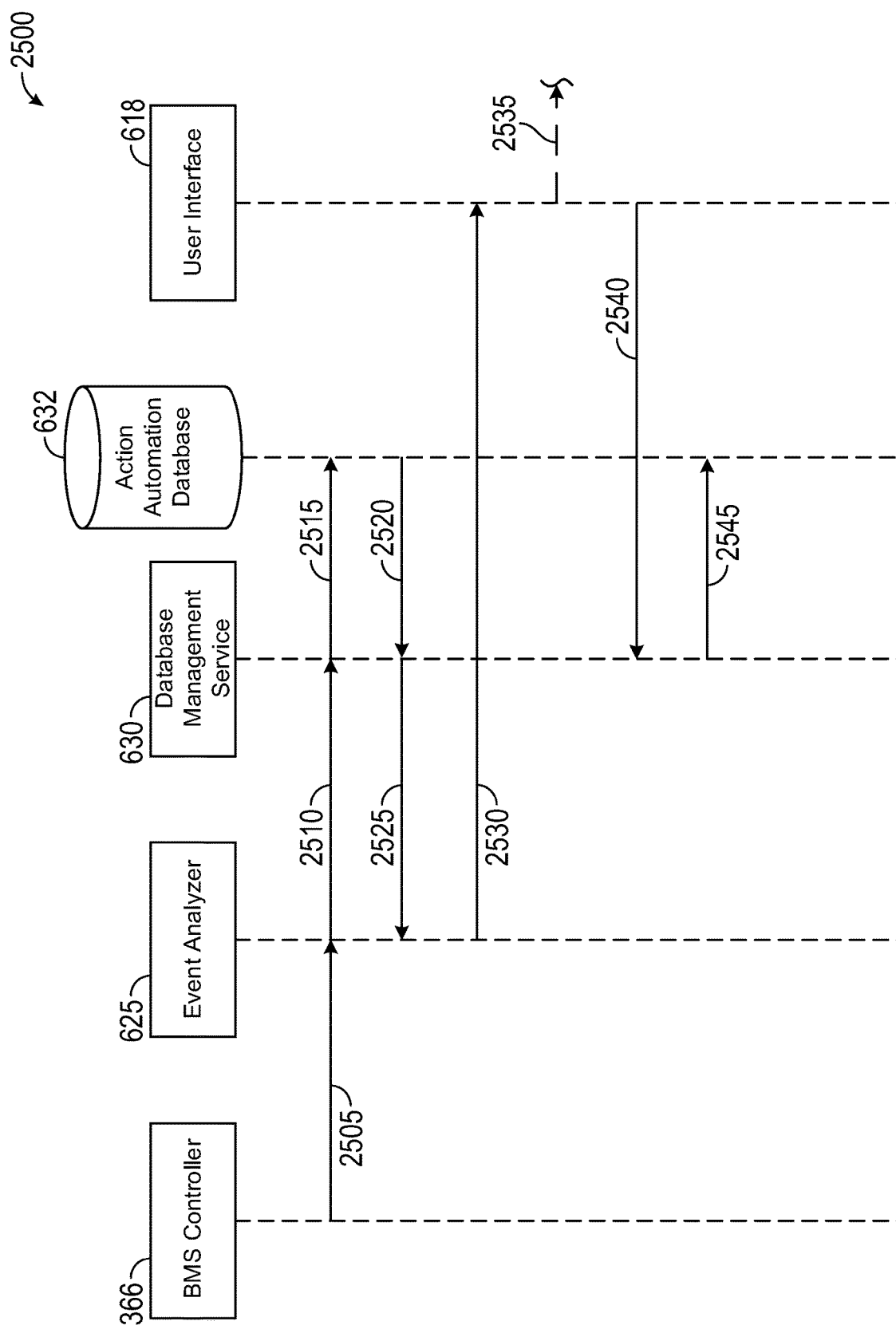
FIG. 25 is a dataflow diagram of selecting and displaying action items based on analyzing BMS data, according to some embodiments.

Referring now to FIG. 25, dataflow 2500 associated with providing automation suggestions (e.g., requests to execute actions 634) is shown, according to an exemplary embodiment. At step 2505, BMS controller 366 sends BMS data to event analyzer 625. BMS data may describe user interactions with BMS 500 (e.g., silencing an alarm, raising a temperature set point, etc.). For example, the BMS data may describe user input to a BMS system. Additionally or alternatively, BMS data my include alarm data. Event analyzer 625 may classify the BMS data. For example, event analyzer 625 may classify a door ajar alarm as a security alarm. In various embodiments, event analyzer 625 classifies the BMS data according to a hierarchy. At step 2510, event analyzer 625 sends a request to 630 to search action automation database 632 for actions 634 that relate to the BMS data. For example, event analyzer 625 may request database management service 630 search action automation database 632 with a BMS data classification. At step 2515, database management service 630 searches action automation database 632 according to the request in step 2510. At step 2520, action automation database 632 sends to database management service 630 one or more actions 634 associated with the search.

At step 2525, database management service 630 sends the actions 634 to event analyzer 625. At step 2530, event analyzer 625 sends the actions 634 to user interface 618. In various embodiments, user interface 618 formats the actions 634 for display. For example, user interface 618 may generate a suggestion (e.g., suggestion 1000, email suggestion 1100) based on the actions 634. In various embodiments, user interface 618 is configured to display the actions 634 to the user. The user may accept or reject the actions 634. At step 2535, user interface 618 may send an indication to execute the actions 634. In various embodiments, step 2535 is performed in response to receiving an indication from the user to execute the action 634 (e.g., the user accepts the action 634). At step 2540, user interface 618 sends an indication to database management service 630 to update the actions 634. Database management service 630 may update one or more attributes associated with the actions 634. For example, database management service 630 may update a "date dismissed" date of a specific action 634. At step 2545, database management service 630 sends an indication to update actions 634 to action automation database 632. The indication may include a description of which specific actions 634 to update and what attributes (e.g., parameters) to update. In response to receiving the indication from database management service 630, action automation database 632 may update actions 634.

Figure 26:
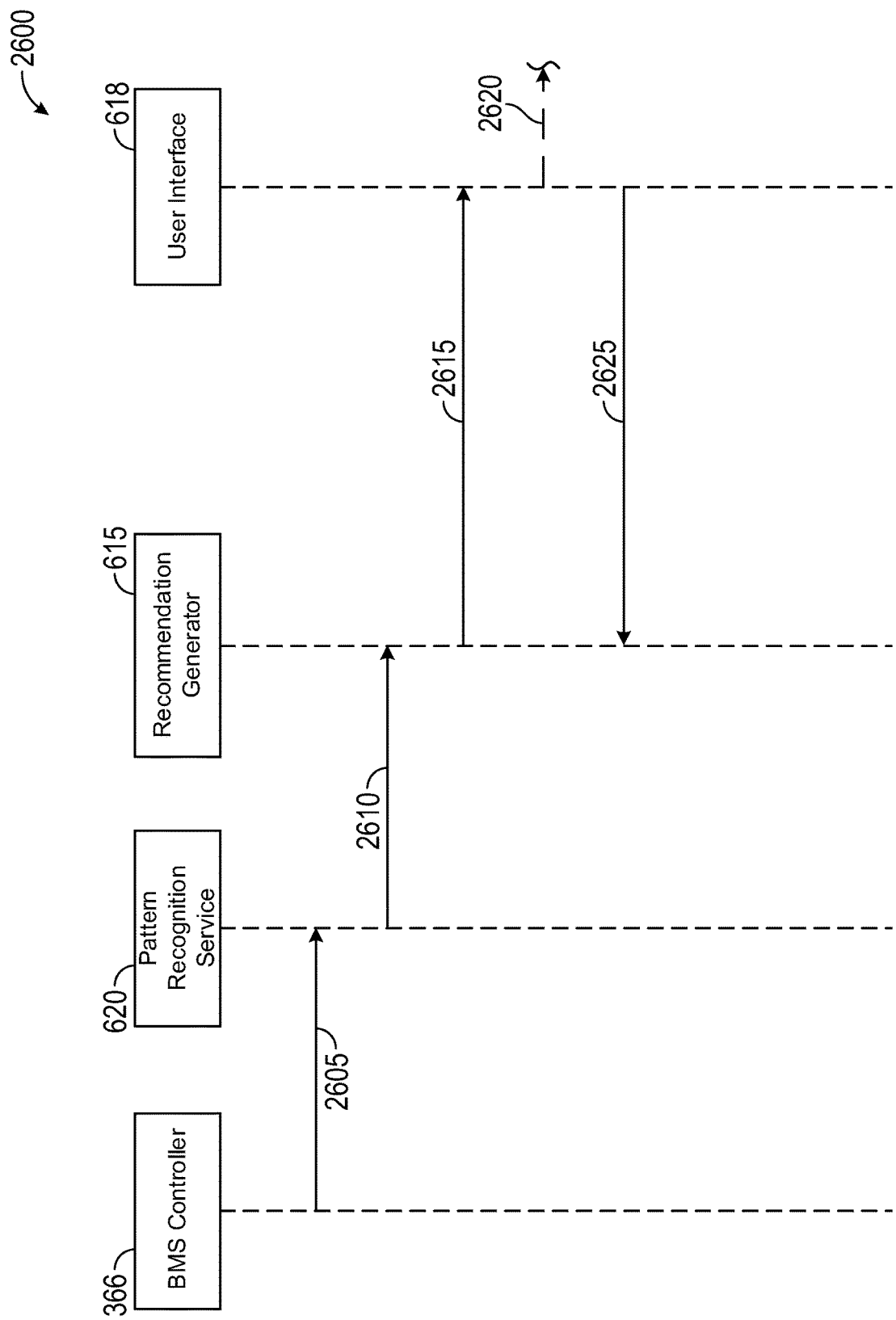
FIG. 26 is a dataflow diagram of generating and displaying action items based on analyzing BMS data, according to some embodiments.

Referring now to FIG. 26, dataflow 2600 associated with active automation is shown, according to an exemplary embodiment. At step 2605, BMS controller 366 sends BMS data to pattern recognition service 620. BMS data may include user actions, alarms data, and/or other data related to BMS 500. Pattern recognition service 620 may analyze the BMS data and determine a pattern. The pattern may represent a series of repeated user actions. Additionally or alternatively, the pattern may represent a user response to a BMS event. At step 2610, pattern recognition service 620 may send the pattern to recommendation generator 615. Recommendation generator 615 may generate an action 634. In some embodiments, recommendation generator 615 queries action automation database 632 to determine if an existing action 634 is associated with the pattern. Additionally or alternatively, recommendation generator 615 may generate an action 634. At step 2615, recommendation generator 615 may send a recommendation request (e.g., a request to execute an action 634) to user interface 618 for display to a user. User interface 618 may format the recommendation request for display to a user. For example, user interface 618 may display automation request 1200 to a user. At step 2620, user interface 618 may send an indication to execute the action 634. In some embodiments, step 2620 is performed in response to a user accepting the recommendation request. At step 2625, user interface 618 sends an indication of the user response (e.g., user accepted the action 634, user rejected the action 634) to recommendation generator 615. In various embodiments, recommendation generator 615 updates actions 634 based on user feedback. For example, recommendation generator 615 may learn from user responses to provide actions 634 that a user will accept.

Figure 27:
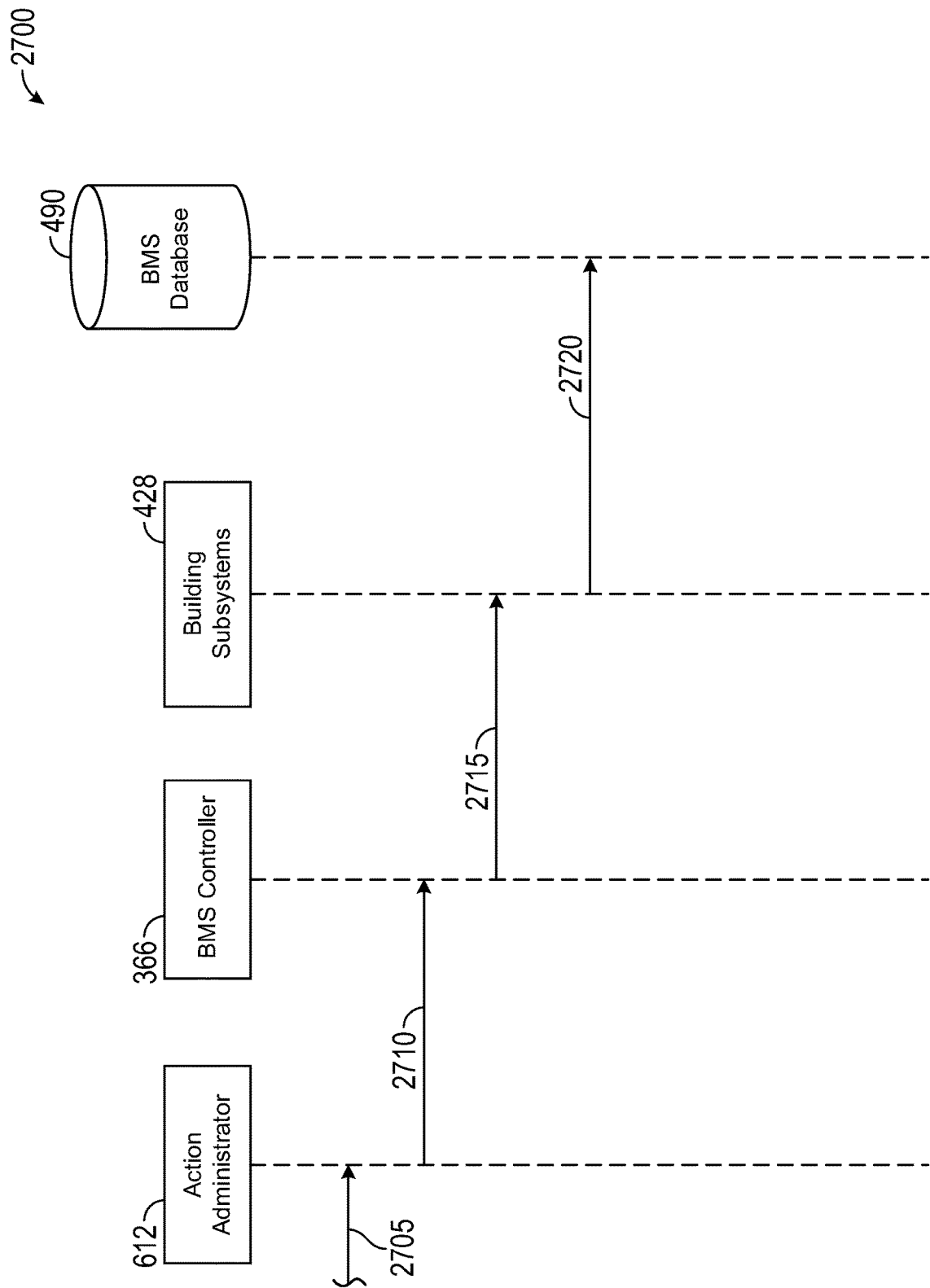
FIG. 27 is a dataflow diagram of executing action items, according to some embodiments.

Referring now to FIG. 27, dataflow 2700 is shown, according to an exemplary embodiment. Dataflow 2700 may relate to executing one or more actions 634. At step 2705, action administrator receives actions 634 for execution. Action administrator 612 may generate one or more BMS control signals based on actions 634. For example, the actions 634 may relate to resetting stale user account passwords and action administrator 612 may generate one or more control signals to cause one or more computer systems associated with the BMS to reset the stale user account passwords. At step 2710, action administrator 612 sends one or more control signals to BMS controller 366. BMS controller 366 may route the control signals. At step 2715, BMS controller 366 sends the control signals to building subsystems 428 as appropriate. For example, a first control signal for a HVAC system is sent to an HVAC subsystem and a second control signal for a security system is sent to a security subsystem. At step 2720, building subsystems 428 update BMS database 490. For example, BMS database 490 may be updated to widen alarm limits associated with a motion sensor.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system to replicate user interaction with a building management system (BMS), the system comprising:

a processing circuit including a processor and memory, the memory having instructions stored thereon that, when executed by the processor, cause the processing circuit to:
    receive first BMS data describing a first BMS event having a first category;
    receive second BMS data describing a user response to the first BMS event;
    generate a model, based on the first and second BMS data, describing response patterns associated with the user response, wherein the response patterns include actions to replicate the user response;
    generate, in response to receiving third BMS data describing a second BMS event different than the first BMS event, the second BMS event having the first category, a response to the second BMS event, the response comprising one or more control signals based on the actions in the model to control the BMS to replicate the user response,
    wherein the response is different than the response to the first BMS event;
    periodically query the BMS with one or more search terms to determine associated BMS equipment having a problem;
    generate, based on the query, one or more action items to solve the problem, wherein the one or more action items are different than the user response to the first BMS event and the response to the second BMS event; and
    update the model to include the one or more action items;
    wherein the problem is at least one of a fault or an override.

2. The system of claim 1, the memory further having instructions stored thereon that, when executed by the processor, cause the processing circuit to execute the updated model by generating the one or more control signals based on the one or more action items to change a parameter associated with BMS equipment having the problem.

3. The system of claim 1, wherein the system configures a user interface of the BMS based on the model.

4. The system of claim 3, wherein the system configures the user interface of the BMS based on the model and an estimated interest associated with information displayed by the user interface.

5. The system of claim 1, wherein the response to replicate the user response include at least one of a trend correction action or an alarm override action.

6. The system of claim 1, wherein the system interacts with the BMS through an application programming interface (API).

7. A method of replicating user interactions with a building management system (BMS), the method comprising:
    receiving, from the BMS, first BMS data describing a first BMS event having a first category;
    receiving, from the BMS, second BMS data describing a user response to the first BMS event;
    generating a model, based on the first and second BMS data, the model describing response patterns associated with the user response, wherein the response patterns include one or more actions to replicate the user response;
    in response to receiving from the BMS, third BMS data describing a second BMS event different than the first BMS event, the second BMS event having the first category, sending data to the BMS based on the model, wherein the data includes an action of the one or more actions to control the BMS to replicate the user response,
    wherein the action is different than the user response to the first BMS event;
    periodically querying the BMS with one or more search terms to identify associated BMS equipment having a problem;
    generating, based on the querying, one or more additional actions to address the problem, wherein the one or more additional actions are different from the user response to the first BMS event and the user response and the action; and
    updating the model to include the one or more additional actions;
    wherein the problem is at least one of a fault or an override.

8. The method of claim 7, further comprising executing the updated model by sending additional data to the BMS, wherein the additional data includes the one or more additional actions to change a parameter associated with BMS equipment having the problem.

9. The method of claim 7, further comprising configuring a user interface of the BMS based on the model.

10. The method of claim 9, further comprising:
    generating an interest score, the interest score representing a user's estimated interest in information displayed by the user interface; and
    updating the user interface based on the interest score.

11. The method of claim 7, wherein the one or more actions to replicate the user response include at least one of a trend correction, an equipment scheduling action, or an alarm override action.

12. An automated facility manager for a building management system (BMS), comprising:
    an action database, the action database storing one or more actions;
    a behavior analysis circuit, configured to:
        receive user input to the BMS, the user input describing a user response to a first BMS event;
        classify the user input based on a category, the category describing a type of interaction with the BMS; and
        generate actions to replicate the user response based on the category;
    a behavior replication circuit, configured to:
        execute the one or more actions to generate one or more control signals to send to the BMS, wherein the one or more control signals cause the BMS to replicate the user response to the first BMS event in order to respond to a second BMS event different than the first BMS event, the second BMS event having a first category,
    wherein the one or more control signals cause a response different than the user response to the first BMS event, and
    an audit circuit configured to:
        periodically query the BMS with one or more search terms to determine associated BMS equipment having a problem; and
        generate, based on the query, actions to solve the problem, wherein the actions are different than the user response to the first BMS event and the response to the second BMS event;
        wherein the problem is at least one of a fault or an override.

13. The automated facility manager of claim 12, the audit circuit further configured to:

execute the actions by generating the one or more control signals to change a parameter associated with BMS equipment having the problem.

14. The automated facility manager of claim 12, wherein the behavior analysis circuit is further configured to modify a user interface of the BMS based on the received user input.

15. The automated facility manager of claim 14, wherein the behavior analysis circuit is further configured to modify the user interface based on an estimated interest associated with information displayed by the user interface.

16. The automated facility manager of claim 12, wherein the one or more actions include at least one of a trend correction action, an equipment scheduling action, or an alarm override action.

17. The automated facility manager of claim 12, wherein the automated facility manager interacts with the BMS through an application programming interface (API).

* * * * *